United States Patent
Shirai et al.

(10) Patent No.: US 7,584,162 B2
(45) Date of Patent: Sep. 1, 2009

(54) MANUFACTURE DATA ANALYSIS METHOD AND MANUFACTURE DATA ANALYZER APPARATUS

(75) Inventors: Hidehiro Shirai, Kawasaki (JP); Hidetaka Tsuda, Kawasaki (JP)

(73) Assignee: Fujitsu Microelectronics Limited, Tokyo (JP)

(*) Notice: Subject to any disclaimer, the term of this patent is extended or adjusted under 35 U.S.C. 154(b) by 16 days.

(21) Appl. No.: 11/362,102

(22) Filed: Feb. 27, 2006

(65) Prior Publication Data

US 2007/0094196 A1   Apr. 26, 2007

(30) Foreign Application Priority Data

Sep. 14, 2005   (JP)   ............... 2005-267348

(51) Int. Cl.
   *G06N 5/02*   (2006.01)
(52) U.S. Cl. ............... 706/46; 382/100; 355/67
(58) Field of Classification Search ............... 706/46; 700/121, 73; 702/84
   See application file for complete search history.

(56) References Cited

U.S. PATENT DOCUMENTS 4,644,480 A * 2/1987 Haruna et al. ............... 702/84
   2004/0143357 A1 * 7/2004 Schwarm et al. ............ 700/121
   2006/0095237 A1 * 5/2006 Wang et al. ................. 703/2

FOREIGN PATENT DOCUMENTS

| JP | 2001-184329 | 7/2001 |
| JP | 2002-215646 | 8/2002 |
| JP | 2004-029971 A | 1/2004 |
| JP | 3654193 B2 | 6/2005 |

* cited by examiner

*Primary Examiner*—David R Vincent
*Assistant Examiner*—Kalpana Bharadwaj
(74) *Attorney, Agent, or Firm*—Arent Fox LLP

(57) ABSTRACT

It is an object of the present invention to improve analysis accuracy of manufacture data with missing values. First, an analysis target explanatory variable is selected. The manufacture data acquired from each process is separated into a set with missing values and a set without missing values. An evaluation value for evaluating the influence of the explanatory variable on the objective variable is calculated from the manufacture data in the set with missing value and the set without missing values. The manufacture data is analyzed by matching the calculated evaluation value with a reference.

21 Claims, 20 Drawing Sheets

TARGET SAMPLE OF CORRELATION ANALYSIS BETWEEN ITEM A AND ITEM Y AND ANALYSIS RESULT

| SAMPLE NAME | ITEM A | ITEM Y | ANALYSIS RESULT |
|---|---|---|---|
| Lot01 | No5 | 12 | ITEM A=No5→ITEM Y=12 |
| Lot02 | No3 |  | CORRELATION NOT FOUND (NOT TO BE ANALYZED) |
| Lot03 |  | 15 | CORRELATION NOT FOUND (NOT TO BE ANALYZED) |

FIG. 1A

SAMPLE OF INDEPENDENT VARIABLE (ITEMS A, B, AND C) AND DEPENDENT VARIABLE (ITEM Y) AND ANALYSIS RESULT

| SAMPLE NAME | ITEM A | ITEM B | ITEM C | ITEM Y | ANALYSIS RESULT |
|---|---|---|---|---|---|
| Lot01 | No5 | 2 |  | 12 | ITEM C MISSING, A,B,C AND Y CORRELATION NOT FOUND |
| Lot02 | No3 |  | No1 |  | ITEMS BY MISSING, A,B,C AND Y CORRELATION NOT FOUND |
| Lot03 |  | 5 |  | 15 | ITEMS AC MISSING, A,B,C AND Y CORRELATION NOT FOUND |
| Lot04 | No3 | 2 | No1 | 11 | ITEM A=No3, B=2, C=No1→ ITEM Y=11 |

FIG. 1B

SAMPLE OF INDEPENDENT VARIABLE (ITEMS A, B, AND C) AND DEPENDENT VARIABLE (ITEM Y) AND ANALYSIS RESULT

| SAMPLE NAME | ITEM A | ITEM B | ITEM C | ITEM Y | ANALYSIS RESULT |
|---|---|---|---|---|---|
| Lot01 | No5 | 2 | UNKNOWN | 12 | ITEM A=No5, B=2, C=UNKNOWN→ ITEM Y=12 |
| Lot02 | No3 | 3(MEAN VALUE) | No1 | UNKNOWN | ITEMS Y IS UNKNOWN (NOT TO BE ANALYZED) |
| Lot03 | UNKNOWN | 5 | UNKNOWN | 15 | ITEM A=UNKNOWN, B=5, C=UNKNOWN→ITEM Y=15 |
| Lot04 | No3 | 2 | No1 | 11 | ITEM A=No3, B=2, C=No1→ITEM Y=11 |

FIG. 1C

RESULT OBTAINED FROM THE SAME SAMPLE WITHOUT ITEM C WITH MANY DEFICIENCIES

| SAMPLE NAME | ITEM A | ITEM B | ITEM Y | ANALYSIS RESULT |
|---|---|---|---|---|
| Lot01 | No5 | 2 | 12 | ITEM A=No5, B=2 → ITEM Y=12 |
| Lot02 | No3 | 3(MEAN VALUE) | UNKNOWN | ITEMS Y IS UNKNOWN (NOT TO BE ANALYZED) |
| Lot03 | UNKNOWN | 5 | 15 | ITEM A=UNKNOWN, B=5 → ITEM Y=15 |
| Lot04 | No3 | 2 | 11 | ITEM A=No3, B=2 → ITEM Y=11 |

FIG. 1D

| ITEM NAME | TARGET SAMPLE | ANALYSIS RESULT | INFLUENCE INTENSITY |
|---|---|---|---|
| ITEM A | Lot04<br>Lot01 | A=No3 → Y=11<br>A=No5 → Y=12 | DIFFERENCE IN Y CAUSED BY ITEM A IS 1 |
| ITEM B | Lot01, Lot04<br>Lot03 | B=2 → Y=11.5<br>B=5 → Y=15 | DIFFERENCE IN Y CAUSED BY ITEM B IS 3.5 |
| ITEM C | Lot04 | C=No1 → Y=11 | DIFFERENCE IN Y CAUSED BY ITEM C IS NOT FOUND |

FIG. 2

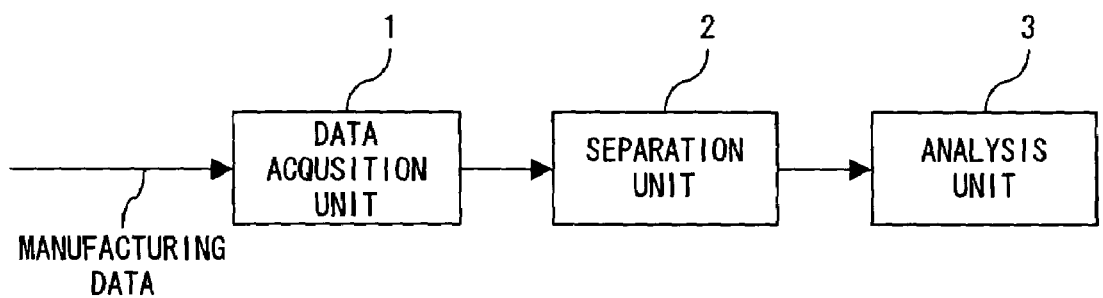
F I G. 3

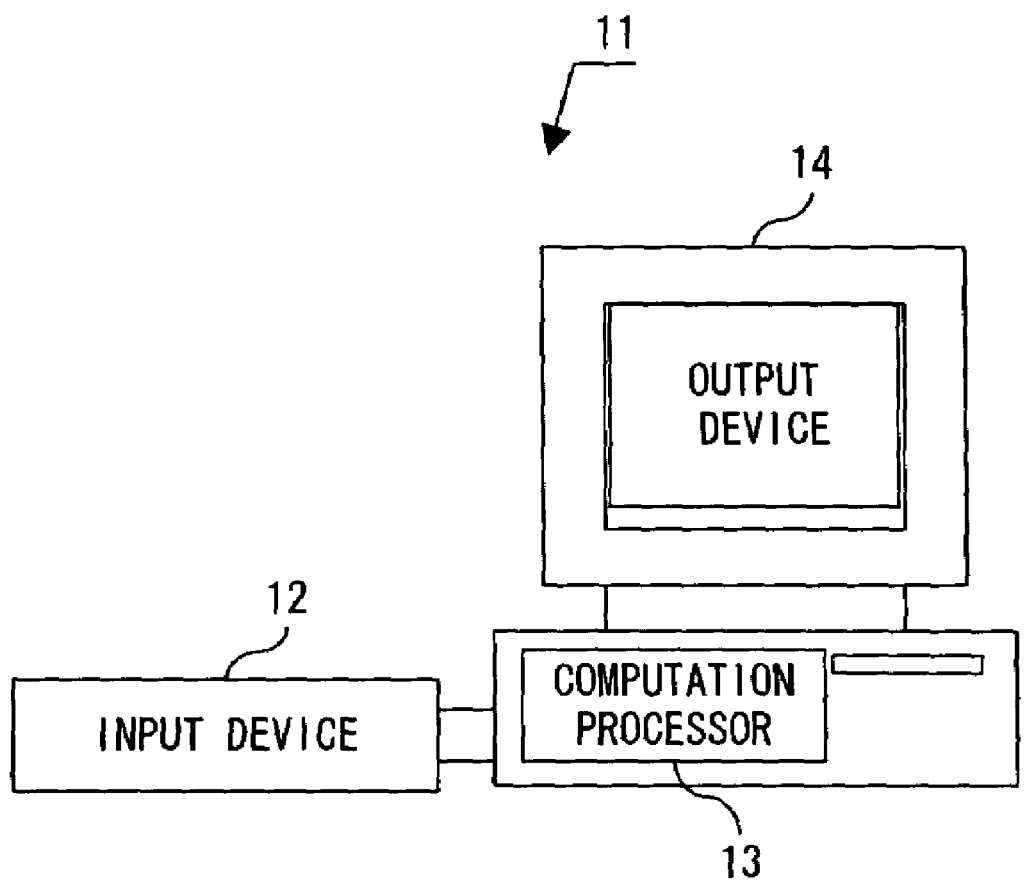
F I G. 4

| SAMPLE NAME | A FILM PROCESS DEVICE NAME | B EXPOSURE PROCESS DEVICE NAME | B EXPOSURE PROCESS CONDITION | C FILM PROCESS DEVICE NAME | PERCENT DEFECTIVE |
|---|---|---|---|---|---|
| Lot01 | No5 |  | 1.9 |  | 5 |
| Lot02 | No1 |  |  | No1 | 4.6 |
| Lot03 |  | No1 | 5.1 |  | 5.4 |
| Lot04 | No3 | No1 | 2.3 | No1 | 5.5 |
| Lot05 | No5 | No1 | 6.2 |  | 7.1 |
| Lot06 | No1 | No1 | 6.3 | No1 | 7.4 |
| Lot07 |  | No1 | 6 |  | 8 |
| Lot08 | No3 |  | 5.1 |  | 5.5 |
| Lot09 | No5 |  | 2.2 |  | 4.5 |
| Lot10 | No1 | No1 | 2.6 |  | 3.7 |
| Lot11 |  | No1 |  |  | 7.7 |
| Lot12 | No3 | No1 | 2.4 |  | 4.9 |
| Lot13 | No5 | No1 | 3 |  | 4.3 |
| Lot14 | No1 | No1 | 4.1 |  | 4.3 |
| Lot15 |  | No1 | 4.6 |  | 5.8 |
| Lot16 | No3 | No1 | 5.7 | No1 | 7.7 |
| Lot17 | No5 | No1 | 6.4 |  | 7.5 |
| Lot18 | No1 | No1 |  | No1 | 7.3 |
| Lot19 |  | No1 | 4.8 |  | 7.1 |
| Lot20 | No3 | No1 | 4.4 |  | 4.9 |
| Lot21 | No5 | No1 | 2.9 |  | 4.5 |
| Lot22 | No1 |  | 2.1 | No1 | 3.6 |
| Lot23 |  | No1 | 3.3 |  |  |
| Lot24 | No1 | No1 | 4.5 | No1 | 12 |
| Lot25 | No5 | No1 | 5.4 |  |  |
| Lot26 | No1 | No1 | 5.8 | No1 | 9.7 |
| Lot27 |  | No1 | 6.5 |  | 9.9 |
| Lot28 | No3 |  | 5.9 |  |  |
| Lot29 | No5 |  | 5 |  | 5.9 |
| Lot30 | No1 | No1 | 4.6 | No1 |  |
| Lot31 |  | No1 | 3.1 |  | 7 |
| Lot32 | No3 | No1 | 2.5 | No1 | 6.1 |
| Lot33 | No5 | No1 | 3.2 |  | 4.9 |
| Lot34 | No1 |  | 4.3 | No1 | 4.7 |
| Lot35 |  |  | 4.9 |  | 6.6 |
| Lot36 | No3 |  | 5.6 | No1 | 4.2 |
| Lot37 | No5 | No1 | 6.1 |  | 6.1 |
| Lot38 | No1 |  | 5.5 |  | 2.6 |
| Lot39 |  | No1 | 5 |  | 7.9 |
| Lot40 | No3 | No1 | 4.2 | No1 | 5.5 |
| Lot41 | No5 | No1 | 2.8 |  | 4.7 |
| Lot42 | No1 | No1 | 2 |  | 4.1 |
| Lot43 |  |  | 2.7 |  | 8.3 |
| Lot44 | No3 | No1 | 4 | No1 | 6.9 |
| Lot45 |  | No1 | 100 | sh??? | 7.4 |

↑ OUTLIER  ↑ ABNORMAL VALUE

FIG. 8

| SAMPLE NAME | A FILM PROCESS DEVICE NAME | B EXPOSURE PROCESS DEVICE NAME | B EXPOSURE PROCESS CONDITION | C FILM PROCESS DEVICE NAME | PERCENT DEFECTIVE | NUMBER OF No1 USAGE | NUMBER OF DEFICIT IN CHARACTER ITEM | NUMBER OF DEFICIT IN NUMERICAL VALUE ITEM |
|---|---|---|---|---|---|---|---|---|
| Lot01 | No5 |  | 1.9 |  | 5 | 0 | 2 | 0 |
| Lot02 | No1 |  |  | No1 | 4.6 | 2 | 1 | 1 |
| Lot03 |  | No1 | 5.1 |  | 5.4 | 1 | 2 | 0 |
| Lot04 | No3 | No1 | 2.3 | No1 | 5.5 | 2 | 0 | 0 |
| Lot05 | No5 | No1 | 6.2 |  | 7.1 | 1 | 1 | 0 |
| Lot06 | No1 | No1 | 6.3 | No1 | 7.4 | 3 | 0 | 0 |
| Lot07 |  | No1 | 6 |  | 8 | 1 | 2 | 0 |
| Lot08 | No3 |  | 5.1 |  | 5.5 | 0 | 2 | 0 |
| Lot09 | No5 |  | 2.2 |  | 4.5 | 0 | 2 | 0 |
| Lot10 | No1 | No1 | 2.6 |  | 3.7 | 2 | 1 | 0 |
| Lot11 |  | No1 |  |  | 7.7 | 1 | 2 | 1 |
| Lot12 | No3 | No1 | 2.4 |  | 4.9 | 1 | 1 | 0 |
| Lot13 | No5 | No1 | 3 |  | 4.3 | 1 | 1 | 0 |
| Lot14 | No1 | No1 | 4.1 |  | 4.3 | 2 | 1 | 0 |
| Lot15 |  | No1 | 4.6 |  | 5.8 | 1 | 2 | 0 |
| Lot16 | No3 | No1 | 5.7 | No1 | 7.7 | 2 | 0 | 0 |
| Lot17 | No5 | No1 | 6.4 |  | 7.5 | 1 | 1 | 0 |
| Lot18 | No1 | No1 |  | No1 | 7.3 | 3 | 0 | 1 |
| Lot19 |  | No1 | 4.8 |  | 7.1 | 1 | 2 | 0 |
| Lot20 | No3 | No1 | 4.4 |  | 4.9 | 1 | 1 | 0 |
| Lot21 | No5 | No1 | 2.9 |  | 4.5 | 1 | 1 | 0 |
| Lot22 | No1 |  | 2.1 | No1 | 3.6 | 2 | 1 | 0 |
| Lot23 |  | No1 | 3.3 |  |  | 1 | 2 | 0 |
| Lot24 | No1 | No1 | 4.5 | No1 | 12 | 3 | 0 | 0 |
| Lot25 | No5 | No1 | 5.4 |  |  | 1 | 1 | 0 |
| Lot26 | No1 | No1 | 5.8 | No1 | 9.7 | 3 | 0 | 0 |
| Lot27 |  | No1 | 6.5 |  | 9.9 | 1 | 2 | 0 |
| Lot28 | No3 |  | 5.9 |  |  | 0 | 2 | 0 |
| Lot29 | No5 |  | 5 |  | 5.9 | 0 | 2 | 0 |
| Lot30 | No1 | No1 | 4.6 | No1 |  | 3 | 0 | 0 |
| Lot31 |  | No1 | 3.1 |  | 7 | 1 | 2 | 0 |
| Lot32 | No3 | No1 | 2.5 | No1 | 6.1 | 2 | 0 | 0 |
| Lot33 | No5 | No1 | 3.2 |  | 4.9 | 1 | 1 | 0 |
| Lot34 | No1 |  | 4.3 | No1 | 4.7 | 2 | 1 | 0 |
| Lot35 |  |  | 4.9 |  | 6.6 | 0 | 3 | 0 |
| Lot36 | No3 |  | 5.6 | No1 | 4.2 | 1 | 1 | 0 |
| Lot37 | No5 | No1 | 6.1 |  | 6.1 | 1 | 1 | 0 |
| Lot38 | No1 |  | 5.5 |  | 2.6 | 1 | 2 | 0 |
| Lot39 |  | No1 | 5 |  | 7.9 | 1 | 2 | 0 |
| Lot40 | No3 | No1 | 4.2 | No1 | 5.5 | 2 | 0 | 0 |
| Lot41 | No5 | No1 | 2.8 |  | 4.7 | 1 | 1 | 0 |
| Lot42 | No1 | No1 | 2 |  | 4.1 | 2 | 1 | 0 |
| Lot43 |  |  | 2.7 |  | 8.3 | 0 | 3 | 0 |
| Lot44 | No3 | No1 | 4 | No1 | 6.9 | 2 | 0 | 0 |
| Lot45 |  | No1 |  |  | 7.4 | 1 | 2 | 1 |

F I G. 9

| RANK | INFLUENCE | ITEM NAME | LOWER SET | | HIGHER SET | | MISSING VALUE SET | DEFICIENCIES INFLUENCE RATE (%) | ANALYSIS RELIABILITY RATE (%) |
|---|---|---|---|---|---|---|---|---|---|
| | | | TARGET VALUE | DISTRIBUTION PROFILE | TARGET VALUE | DISTRIBUTION PROFILE | DISTRIBUTION PROFILE | | |
| 1 | 3.7929 | NUMBER OF No1 USAGE | 2以下 | mean=5.79, s=1.599, N=37 | 3 AND MORE | mean=9.10, s=2.229, N=4 | - | 0.000 | 99.951 |
| 2 | 3.5047 | B EXPOSURE PROCESS CONDITION | 5.6 AND UNDER | mean=5.53, s=1.801, N=29 | OVER 5.6 | mean=7.925, s=1.286, N=8 | mean=6.75, s=1.4434, N=4 | 19.364 | 80.535 |
| 3 | 2.7819 | NUMBER OF DEFICIT IN CHARACTER ITEM | 1 AND MORE | mean=5.709, s=1.672, N=32 | 0 AND UNDER | mean=7.57, s=2.105, N=9 | - | 0.000 | 99.179 |
| 4 | 2.2837 | B EXPOSURE PROCESS DEVICE NAME | | | No1 | med=6.50, s=1.910, N=30 | med=4.70, s=1.528, N=11 | 97.222 | 2.778 |
| 5 | 0.9961 | C FILM PROCESS DEVICE NAME | | | No1 | med=6.10, s=2.349, N=13 | med=5.65, s=1.683, N=28 | 67.481 | 32.519 |
| 6 | 0.6921 | NUMBER OF DEFICIT IN NUMERICAL VALUE ITEM | 0 OR LESS | mean=6.05, s=1.960, N=37 | 1 AND MORE | mean=6.75, s=1.443, N=4 | - | 0.000 | 50.713 |
| 7 | 0.4098 | A FILM PROCESS DEVICE NAME | No5 | med=4.95, s=1.142, N=10 | No1, No3 | med=5.20, s=2.237, N=20 | med=7.40, s=1.233, N=11 | 98.1397 | 0.5861 | mean = MEAN VALUE   med = MEDIAN   s = STANDARD DEVIATION   N = NUMBER OF DATA

F I G. 1 0

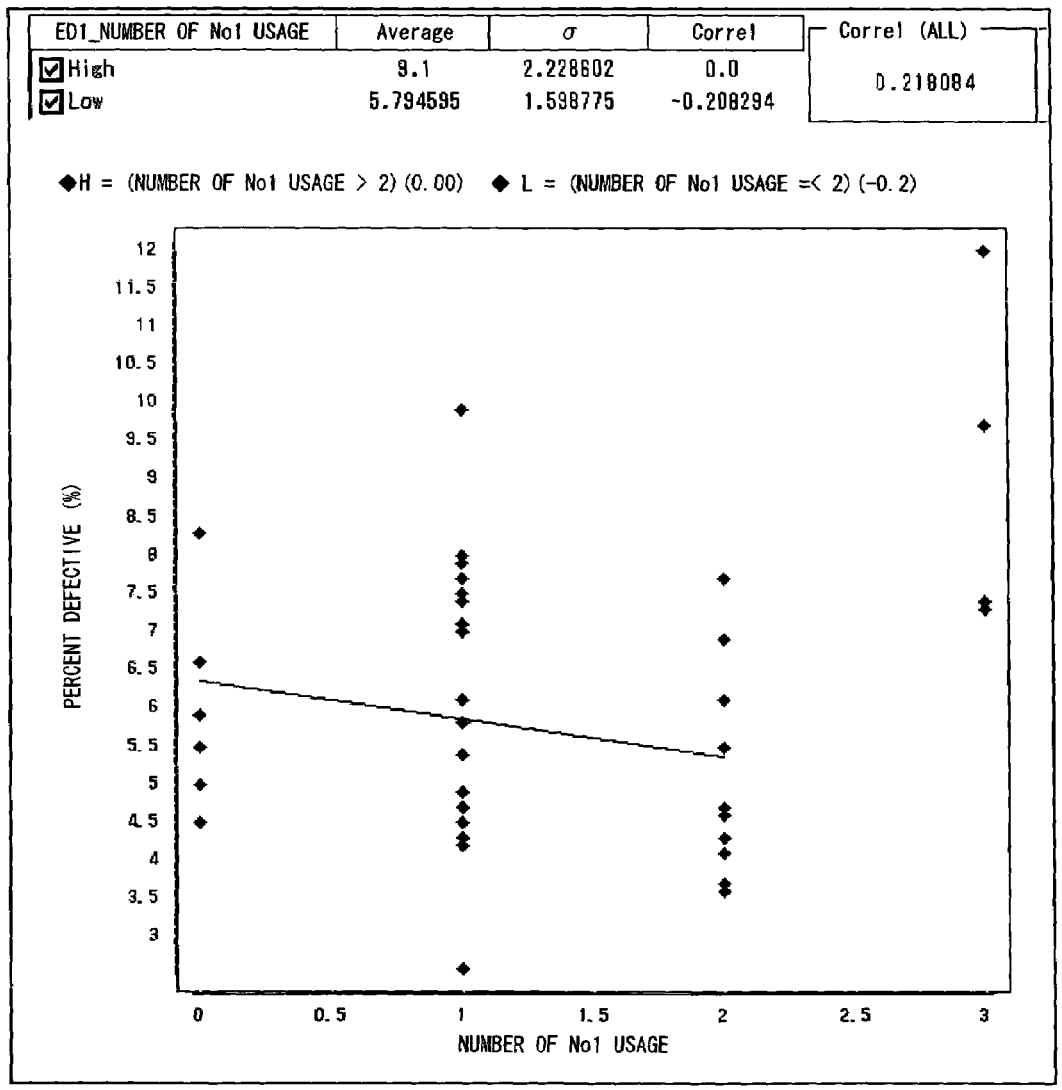
F I G. 1 1

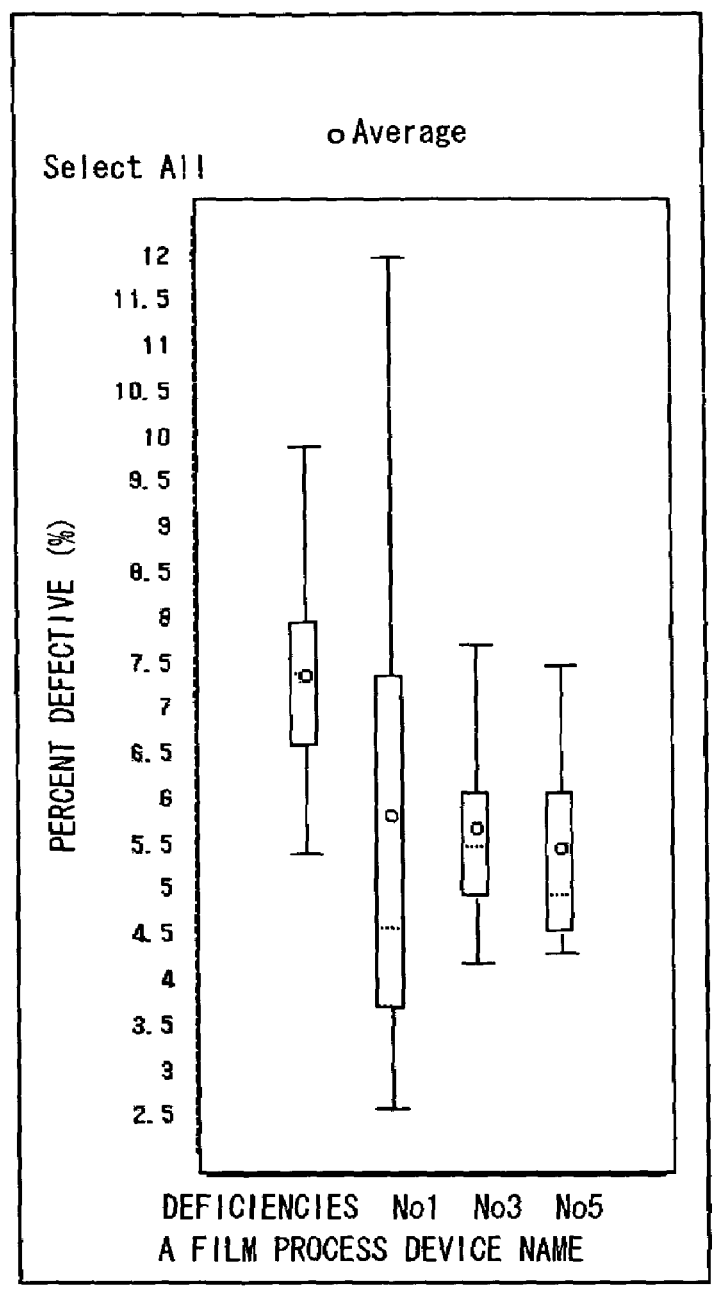
F I G. 17

FIG. 19

| RANK | INFLUENCE | EXPLANATORY VARIABLE NAME | LOWER SET AND DISTRIBUTION | HIGHER SET AND DISTRIBUTION | MISSING VALUE SET DISTRIBUTION | NUMBER OF SAMPLE IN SET | DEFICIENCIES INFLUENCE RATE (%) | ANALYSIS RELIABILITY RATE (%) | MISSING VALUE ESTIMATION VALUE/ MISSING VALUE RESEMBLANCE RATE (%) |
|---|---|---|---|---|---|---|---|---|---|
| 1 | 13.9181 | ITEM D | No2, No5=0.70, s=0.32 | No3=0.86, s=0.21 | MEAN=0.858, s=0.25 | 30:15:35 | 15.426 | 84.571 | No3/79.456 |
| 2 | 11.6522 | ITEM A | (12.4 AND MORE) = 0.71, s=0.25 | (UNDER 12.4) = 0.86, s=0.33 | MEAN=0.84, s=0.32 | 26:35:19 | 9.364 | 90.535 | (11.6)/55.41 |
| 3 | 9.1815 | ITEM C | No1, No3=0.73, s=0.29 | No4, No6=0.833, s=0.34 | MEAN=0.88, s=0.18 | 28:37:15 | 10.241 | 89.179 | No4/44.12 |
| ⋮ | | | | | | | | | |
| 26 | 0.9554 | ITEM X | No1, No5=0.72, s=0.42 | No3, No4=0.853, s=0.28 | MEAN=0.83, s=0.34 | 60:15:05 | 7.481 | 52.519 | No3/29.77 |

MANUFACTURE DATA ANALYSIS METHOD AND MANUFACTURE DATA ANALYZER APPARATUS

CROSS-REFERENCE TO RELATED APPLICATIONS

This application is based upon and claims the benefit of priority from the prior Japanese Patent Application No. 2005-267348 filed on Sep. 14, 2005, the entire contents of which are incorporated herein by reference.

BACKGROUND OF THE INVENTION

1. Field of the Invention

The present invention relates to an analysis method and an analyzer apparatus of manufacture data obtained from manufacture processes.

2. Description of the Related Art

Physical and statistical analysis of what factors in a manufacture process have influence on product quality is necessary for manufacturing products through a plurality of processes, in order to achieve required quality and to enhance the production efficiency. In a case where production involves complicated production processes, there are a number of factors which influence product quality, and therefore, it requires an immense amount of time and effort to physically analyze all factors and to extract highly influencing factors. Thus, in general, a physical analysis is performed after collecting manufacture data in each process, extracting the factors by data analysis and narrowing down the factors. In so doing, an automatic data analysis for efficiently performing an analysis, and data mining for searching for correlations and patterns hidden in a large volume of data are performed.

However, some values may be missing from actual manufacture data, and for that reason, it is difficult to analyze the manufacture data without any change.

As shown in FIG. 1A, in analyzing the causal correlation between an item A and an item Y, for example, Lot 01 where data of both items A and Y are present is not a data analysis target; however, Lot 02 and 03 are analysis targets for either one of the data is missing.

In analyzing a causal correlation between independent variable (explanatory variable) items A, B and C and an dependent variable (objective variable) item Y, as shown in FIG. 1B, in a sample Lot 04, the values of the items A, B and C and the dependent variable item Y are obtained so that the correlation between the items can be examined. However, the correlation between the items A, B and C and the item Y is not clear in samples Lot 01, Lot 02, and Lot 03 because data of the independent variable item C is missing from the sample Lot 01, data of the independent variable item B and the dependent variable item Y are missing from the sample Lot 02, and data of the items A and C are missing from the sample Lot 03.

FIG. 1C shows a case when there is a missing value in the sample as in FIG. 1B, a character string "unknown" (a string representing a missing value) is used for substitution of the missing value in a sample in which the item C of the apparatus name is missing, and the value "3" which is an average value of the item B of samples is used for substitution of the missing value in a sample in which the numeral item B is missing.

FIG. 1D shows the values of each item and analysis results when the item C having many missing values is excluded from the sample in FIG. 1C. The sample Lot 02 is not to be analyzed for its dependent variable item Y is missing.

FIG. 2 is a comparison result of the degree of the influence on the dependent variable (item Y) among the independent variables (items A, B and C) using the sample data of FIG. 1D. The difference between values of item Y with the value of the item A is "1", the difference between values of item Y with the value of the item B is "3.5", and the difference in Y with the value of the item C is unknown.

In the past, when analyzing a plurality of manufacture data, when there is a missing value, to handle the missing value in the same way as the normal value, data analysis required to insert a substitution value, to exclude a sample with many missing values, or to exclude an item with many missing values.

Patent Document 1 describes that when a characteristic value of sample data is missing, a Manhattan distance between the missing data and the normal data is obtained, and the normal data of the minimum Manhattan distance is complemented as the substitution of the missing data.

Patent Document 2 describes that when extracting correlated partial condition data by combining a plurality of feature amount and events, the presence/absence of the input event in a selected area is determined, and when the input event has a defect value, the complemented value of the defect value based on the events in the selected area corresponding to the feature amount other than the defect value is calculated.

As described above, in the past, when there is a missing value in analysis target data, the substitution value of the missing value is obtained by any method, and the data is analyzed by using the substitution value, or the data is analyzed excluding sample data with a number of missing values.

However, the analysis results vary depending on the value to be used as a substitution value instead of the missing value, and the percentage set as the criterion to exclude the sample containing higher percentage of missing values. For this reason, there is a problem that variation occurs in the analysis accuracy. In addition, when using samples without a missing value for each item, the number of samples would be different from sample to sample, causing variations in the analysis accuracy between items.

For example, a regression tree analysis requires to separate the data into two sets, which are a set with the values of the dependent variable item is large and a set with the values of the dependent variable item is small, determined by a value of an independent variable item, in order to determine the intensity of the influence of the independent variable on the dependent variable. When the sample has a missing value, the analysis cannot be performed, and therefore, a substitution value is used for the analysis as stated above. At that time, the dependent variable value would be in either the set with large values or the set with small values depending on the substitution value, causing an analysis error.

[Patent Document 1] Japanese Patent No. 3654193
[Patent Document 2] Japanese Published Patent Application No. 2001-184329

SUMMARY OF THE INVENTION

It is the object of the present invention to improve data analysis accuracy where manufacture data has missing values.

The manufacture data analysis method of the present invention acquires and stores manufacture data comprising a plurality of values of explanatory variables of a plurality of manufacture processes and an objective variable indicating quality of a product manufactured by a plurality of the manufacture processes, separates a plurality of the stored manufacture data into a set of manufacture data in which an explanatory variable value is missing and a set of manufacture data in which an explanatory variable value is not missing, and evaluates the degree of influence of the explanatory variable on the objective variable by analyzing the set of manufacture data in which an explanatory variable value is missing and a set of manufacture data in which an explanatory variable value is not missing.

According to this invention, even in a case that there are deficiencies in a part of the manufacture data, it is possible to improve manufacture data analysis accuracy by analyzing a set with missing values. It is also possible to improve the reliability of the analysis by analyzing the influence of the missing value of the explanatory variable on the objective variable.

The manufacture data analysis method of the present invention analyzes whether or not there is a significant difference between the objective variable value of the set in which the explanatory variable value is missing and the objective variable value of the set in which the explanatory variable value is not missing, and evaluates whether or not the missing value of the explanatory variable has influence on an analysis result.

With this configuration, it is possible to improve the reliability of the analysis result by analyzing whether or not the manufacture data with missing explanatory variables has influence on the objective variable value.

The manufacture data analysis method of the present invention separates a plurality of manufacture data into at least two, first and second, sets according to the value of each explanatory variable, and calculates influence data as a first evaluation value for indicating the intensity of influence of each explanatory variable on the objective variable based on the objective variable value of the first set and the objective variable value of the second set.

With such a configuration, it is possible to evaluate which explanatory variable has a high degree of influence on the objective variable.

The manufacture data analysis method of the present invention calculates a deficiency influence rate as a second evaluation value for evaluating influence of the manufacture data in which an explanatory variable value is missing on an analysis result based on a first probability indicating whether or not there is a significant difference between the manufacture data set in which an explanatory variable value is missing and a mean value of the objective variable of the first set and a second probability indicating whether or not there is a significant difference between the manufacture data set in which an explanatory variable value is missing and a mean value of the objective variable of the second set.

Such a configuration allows to improve the reliability of the analysis result as the configuration enables to evaluate the extent of influence of the missing values of the explanatory variable on the analysis result.

The manufacture data analysis method of the present invention counts the number of occurrence of the same value in a plurality of explanatory variables, adds the counted number of occurrence as a new explanatory variable, and calculates influence data indicating the intensity of the influence of the number of occurrence on the objective variable.

This configuration allows the evaluation of influence of a particular value of the explanatory variable on the analysis result.

The manufacture data analysis method of the present invention counts the number of deficiencies of a character string or a numerical value, which is the explanatory variable value, adds the counted number of occurrence as a new explanatory variable value, and calculates influence data indicating the intensity of the influence of the number of deficiencies on the objective variable.

By having this configuration, it is possible to improve the reliability of the data analysis for the influence of the missing value of the explanatory variable on the analysis result can be evaluated.

The manufacture data analysis apparatus of the present invention comprises a data acquisition unit for acquiring manufacture data comprising a plurality of values of explanatory variable of a plurality of manufacture processes and an objective variable indicating quality of a product manufactured by a plurality of the manufacture processes, a separation unit for separating a plurality of the manufacture data acquired by the data acquisition unit into a set of manufacture data in which an explanatory variable value is missing and a set of manufacture data in which an explanatory variable value is not missing, and an analysis unit for evaluating the degree of influence of the explanatory variable on the objective variable by analyzing the set of manufacture data in which an explanatory variable value is missing and a set of manufacture data in which an explanatory variable value is not missing.

According to the present invention, it is possible to improve the manufacture data analysis accuracy even in a case that there are deficiencies in a part of manufacture data by analyzing a set with missing values. It is also possible to improve the reliability of the analysis by analyzing the influence of the missing values of the explanatory variable on the objective variable value.

BRIEF DESCRIPTION OF THE DRAWINGS

FIG. 1A through FIG. 1D are diagrams showing independent variables, dependent variables, and analysis results;

FIG. 2 is a diagram showing the intensity of the influence of the independent variables on the dependent variable;

FIG. 3 is a diagram explaining the embodiments;

FIG. 4 is a configuration diagram of the manufacture data analysis apparatus of the embodiments;

FIG. 8 is a diagram showing an example of manufacture data;

FIG. 9 is a diagram showing the manufacture data to which the number of occurrence of a value and the number of deficiencies are added as items;

FIG. 10 is a diagram showing the intensity of the influence of the explanatory variable on the objective variable;

FIG. 11 is a diagram showing a correlation between the number of usage of the device No. 1 and the percent defective;

FIG. 17 is a diagram showing a correlation between the A film process device name and the percent defective;

FIG. 19 is a diagram showing an evaluation list of the first branch candidate.

DESCRIPTION OF THE PREFERRED EMBODIMENT

Figure 5:
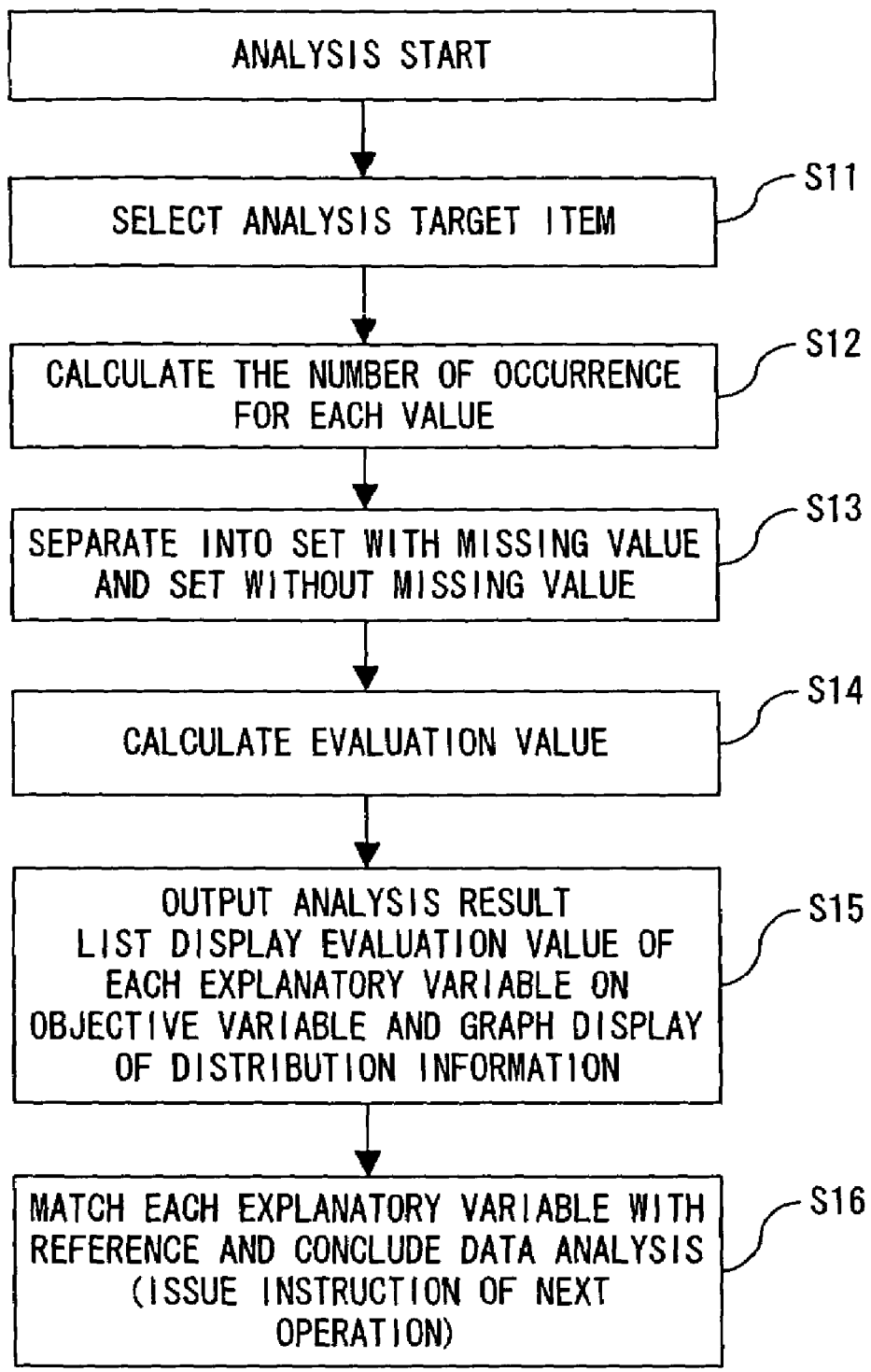
FIG. 5 is a flowchart showing an outline of the data analysis processes.

The following description explains embodiments of the present invention with reference to the drawings. FIG. 3 is an explanatory diagram of an embodiment of the present invention.

In FIG. 3, the manufacture data analysis apparatus comprises a data acquisition unit 1 for acquiring manufacture data involving a plurality of explanatory variable values of a plurality of manufacture processes and an objective variable for indicating quality of products produced by a plurality of the manufacture processes, a separation unit 2 for separating the manufacture data acquired by the data acquisition unit 1 into a set of manufacture data having the missing explanatory variable and a set of manufacture data not having the missing explanatory variable, and a analysis unit 3 for analyzing the set of manufacture data having the missing explanatory variable and a set of manufacture data not having the missing explanatory variable and for evaluating the degree of influence of the explanatory variable on the objective variable.

According to the present invention, even when a part of manufacture data is missing, accuracy of analysis of manufacture data can be improved by analyzing a set with the missing value. The reliability of analysis can be also improved by analyzing the influence of the value of the missing explanatory variable on the value of the objective variable.

FIG. 4 is a diagram illustrating a configuration of a manufacture data analysis apparatus 11 of the present embodiment.

In FIG. 4, an input device 12 includes a keyboard etc., and inputs manufacture data of each process in a manufacture line. A computation processor 13 includes a personal computer etc., executes manufacture data analysis process explained later, and displays the analysis result on an output device 14 including a display etc.

FIG. 5 is a flowchart showing an outline of the manufacture data analysis process of the present embodiment. The following processes are executed by a CPU (not shown) in the computation processor, and the data in processing and the analysis result data are stored in a storage means such as a memory.

From the manufacture data (explanatory variable values and objective variable values) obtained from each manufacture process, the item of analysis target explanatory variable is selected (FIG. 5, S11). The explanatory variable is, for example, a factor, which has influence on the outcome (quality) of the product such as device names, manufacture conditions and process dates used in each manufacture process, and the objective variable is a variable value such as percent defective, yield, an electrical characteristic value of the product, which depends on the influence of the explanatory variable.

Next, the number of occurrence of the same value independently of the items of the explanatory variable is calculated (S12). The number of occurrence for each explanatory variable value indicates the number of occurrence of a value such as a device number, manufacture conditions, a measured value, and a missing value when the same device is used for each manufacture process, for example.

Next, the manufacture data collected from each manufacture process is separated into a set of manufacture data where the explanatory variable is missing and a set of manufacture data where the explanatory variable is present (S13).

Next, the evaluation value of each explanatory variable is calculated (S14). The evaluation value is, for example, a value indicating the degree of influence of the explanatory variable on the objective variable, a probability of having a different analysis result when analysis included the manufacture data with the missing value from the result when analysis excluded the manufacture data with the missing value, or others.

Next, the evaluation value of each explanatory variable is displayed on a list, while displaying a graph showing a relationship of the value of the explanatory variable (device number, process conditions etc.) and the value of the objective variable (S15).

Finally, data analysis is performed by matching the evaluation value of each explanatory variable with a predetermined reference, and what analysis is to be performed is determined based on the analysis result (S16).

According to the above manufacture data analysis process, by separating the manufacture data into a set of manufacture data having a missing value of the explanatory variable and a set of manufacture data not having the missing explanatory variable, and evaluating the influence of the manufacture data where the explanatory variable is missing, data analysis accuracy and reliability can be improved.

Figure 6:
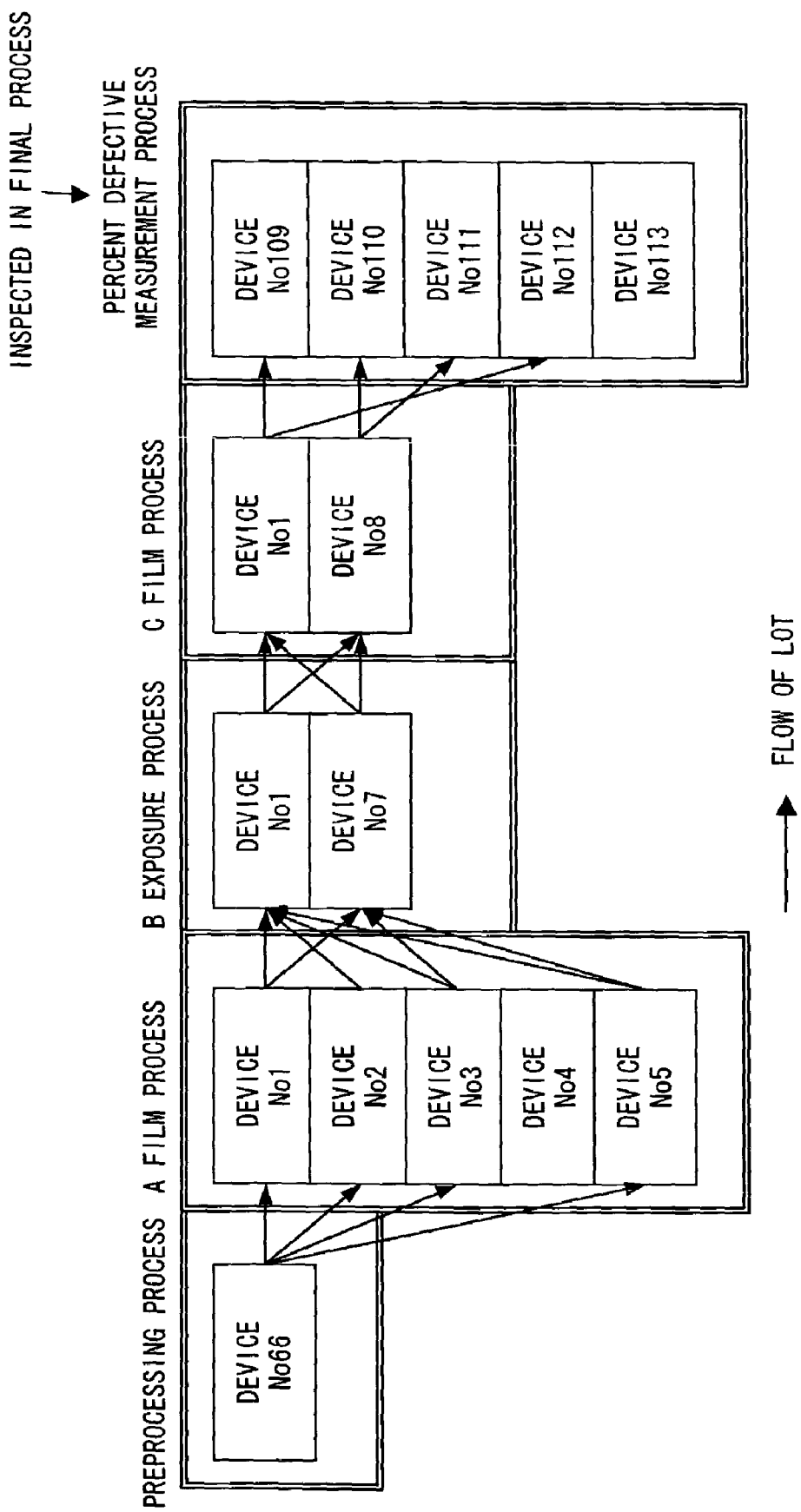
FIG. 6 is a diagram describing an apparatus employed in a semiconductor manufacture process.

Next, details of a manufacture data analysis method are explained with an example of an analysis of manufacture data obtained from a semiconductor manufacture process. FIG. 6 is a diagram describing a semiconductor manufacture process and apparatuses used in each manufacture process.

The semiconductor manufacture process involves repetitions of a process to form an insulator on a silicon substrate, a process to form a pattern, and a process of etching, and the production is completed after 1000 processes or more in total.

FIG. 6 shows a part of the semiconductor manufacture process, and the process comprises a preprocessing process, an A film process for forming a film, a B exposure process for exposure, C film process for forming a film, and percent defective measurement process for measuring percent defective by a final inspection of the product.

A device with No. 66 is used in the preprocessing process, devices with No. 1-5 are used in the A film process, and devices with No. 1 and 7 are used in the next B exposure process. Devices with No. 1 and 8 are used in the next C film process, and devices with No. 109-113 are used for the percentage defective measurement process.

In the semiconductor manufacture process, the same device is repeatedly used in different processes, and for example, the device No. 1 is used in the A film process, the B exposure process, and the C film process.

Figure 7:
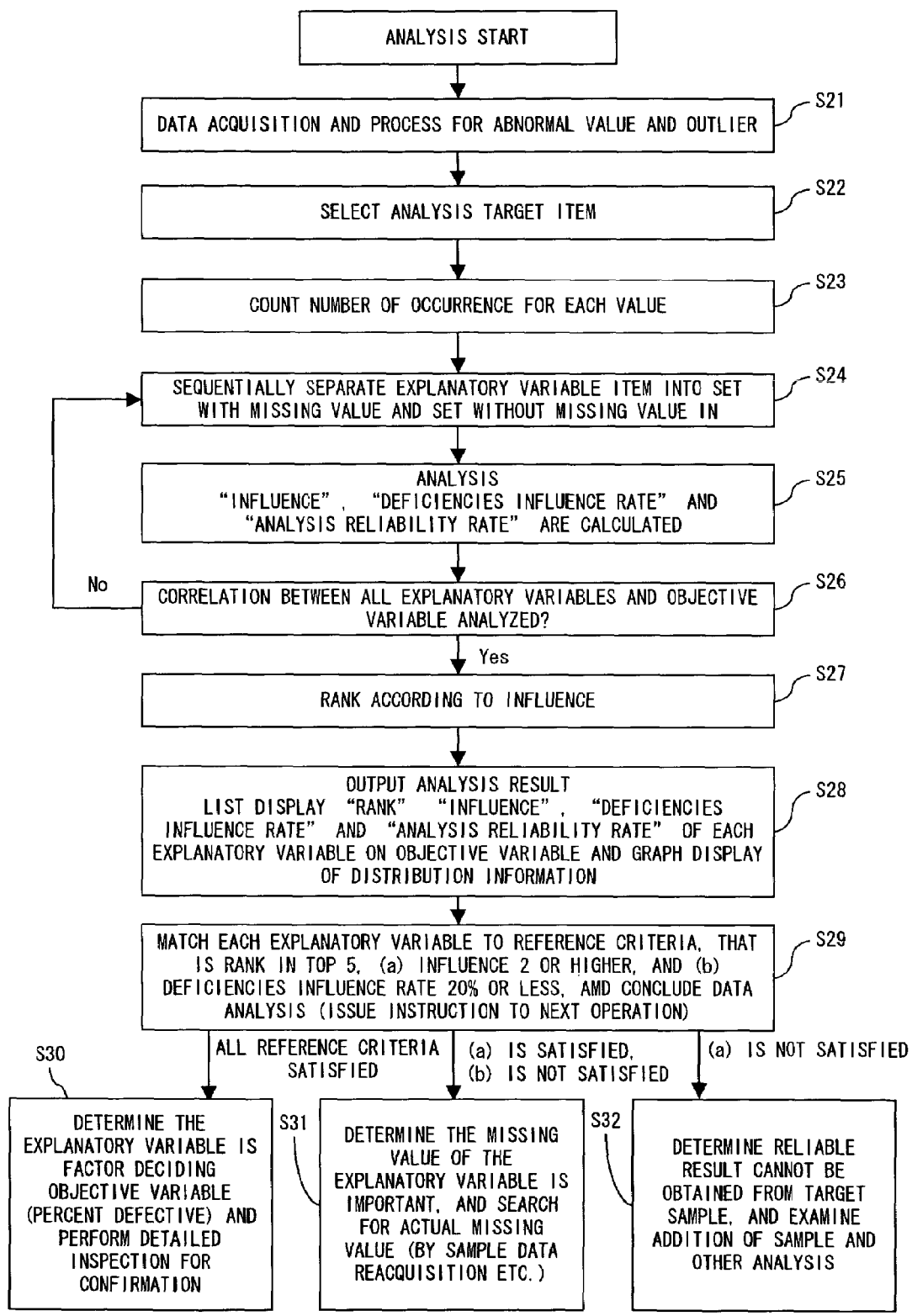
FIG. 7 is a flowchart of the data analysis process of the first embodiment.

In the following, a description of a manufacture data analysis process for analyzing the intensity of causal correlation between the explanatory variable and the objective variable of the above semiconductor manufacture process with reference to a flowchart of FIG. 7 is provided.

First, the manufacture data of each manufacture process is obtained and the data is stored in memory, an external storage device or the like. At that time, abnormal values and anomalies in the manufacture data are removed (FIG. 7, S21). Determination of whether the manufacture data is an abnormal value or an anomaly or not is made by determining a device name, which does not exist in the manufacture process of the analysis target, as an abnormal value, and by determining the value of the explanatory variable, which does not fall into a range of a sample data average value ±4×standard deviation, as an anomaly, for example.

FIG. 8 shows an example of manufacture data obtained from the semiconductor manufacture process of FIG. 6. The explanatory variable value "100" of B exposure condition in Lot 45 of the sample data does not fall into the range of an average value of other sample values ±4×standard deviation, and therefore it is determined as an anomaly. In the same sample data, the device name "sh???", which is an explanatory variable of the C film process, is determined as an abnormal value for such a device name is not registered. These data are processed as missing values.

Next, analysis target item is selected (S22). For this analysis target item, the device name of the A film process, the device name of the B exposure process, the B exposure process conditions, the C film process device name, the percent defective measured in the percent defective measurement process is selected as shown in FIG. 8.

Next, the number of occurrence for each value is calculated by counting the number that the same value in a plurality of the explanatory variables appears (S23).

Next, for each explanatory variable, the manufacture data is separated into a set of manufacture data having the missing explanatory variable and a set of manufacture data without the missing explanatory variable (S24).

Next, influence data (first evaluation value) indicating the intensity of influence of each explanatory variable on the objective variable, deficiency influence rate (second evaluation value) for evaluating the degree of influence of manufacture data having a missing value on the relation between the explanatory variable and the objective variable, and analysis reliability rate (third evaluation value) indicating the reliability of the analysis are calculated (S25).

The influence data is a value obtained by separating explanatory variable into two sets in accordance with the value (a device name or a numerical value), and standardizing the difference in the average values of objective variables in two sets by the difference of standard deviations of the two sets. When there are three or more values of the explanatory variable, they are separated to the two sets so that the value of the influence data becomes the maximum.

For example, using the t-value of the t-test, the influence data can be calculated as below.

Assume that the average values of objective variable values in the separated two sets are X1 and X2, the squared sum of the objective variables are S1 and S2, and, when the variance of the separated sets does not have a significant difference, the data numbers are N1 and N2, the t-value can be represented by the following equation.

$$t=(X1-X2)\times\{(1/N1+1/N2)\cdot(S1+S2)/(N1+N2-2)\}^{-1/2}$$

The deficiency influence rate can be, for example, calculated by the following method.

The deficiency influence rate can be calculated as an average value of the sum of a probability indicating that with the same explanatory variable, whether there is a significant difference between an average value of the objective variable values in a set of data having a missing value and an average value of the objective variable of a set (first set), which has a higher average value of the separated two sets, and a probability indicating that with the same explanatory variable, whether there is a significant difference between an average value of the objective variable values in a set of data having a missing value and an average value of the objective variable of a set (second set), which has a lower average value of the separated two sets.

The analysis reliability rate (third evaluation value) can be calculated, for example, as follows:

Analysis reliability=(1-deficiency influence rate)×(probability indicating that there is a significant difference between average values of the objective variables in two separated sets).

Next, whether the above influence data, deficiency influence rate and analysis reliability rate are calculated for all explanatory variables and objective variables or not is determined (S26). When the analysis is not terminated, (S26, NO), the process returns to the step S24, and the above process is performed after dividing the rest of the explanatory variable values into the set of the missing value and a set of values other than the missing value.

On the other hand, when the analysis of the relation between all the explanatory variation items and objective variables is terminated (S26, YES), the process proceeds to the step S27, and the explanatory variables are ranked based on the calculated influence data.

Next, the rank of the influence data indicating the intensity of the causal correlation between each explanatory variable and the objective variable, the influence data, the deficiency influence rate, and the analysis reliability rate are displayed on a list, and at the same time, the distribution state of the explanatory variable values and the objective variable value is displayed on a graph (S28).

Next, the conclusion of the data analysis is generated by matching the rank of the influence of each explanatory variable, the influence data, and the deficiency influence rate with a predetermined reference (S29). Specifically, this step determines whether the requirements that the rank of the influence is with in the top 5, the influence data is two and higher (a condition (a)), and the deficiency influence is 20% or less (a condition (b)) are satisfied or not.

When the explanatory variable of the analysis target has the rank of the influence data rank being 5 or higher, and satisfies the conditions (a) and (b), the process proceeds to step S30, and detailed inspection is performed to determine and confirm that this explanatory variable is the factor deciding the objective variable (a defective rate, for example).

When the analysis target explanatory variable has the influence data being "2" or larger, which satisfies the condition (a), but has the deficiency influence rate being larger than 20%, which does not satisfy the condition (b), the process proceeds to step S31. Then, it is determined that the missing value of this explanatory variable is important, and a search for the actual value of the missing value (by sample data reacquisition etc.) is performed.

When the analysis target explanatory variable has the influence data being less than "2", which does not satisfy the condition (a), the process proceeds to step S32, and determines that a reliable result cannot be obtained from the analysis target sample data. Then, the addition of the sample data and an analysis of the other explanatory variables are examined.

Next, details of the content of the above manufacture data analysis process are explained using the manufacture data of each process of FIG. 8 and FIG. 9.

FIG. 9 shows the manufacture data, which is the manufacture data of FIG. 8 to which the number of usage of the device No. 1, the number of deficiencies in the character item, and the number of deficiencies in the numerical value item are added as items of the explanatory variable.

Separation of a set with deficiencies and a set without deficiencies relating to the "A film process device name" of the explanatory variable of FIG. 9 is explained. Among 45 sample data, the sample data missing the device name of the A file process are Lot 03, Lot 07, Lot 11, Lot 15, Lot 19, Lot 23, Lot 27, Lot 31, Lot 35, Lot 39, Lot 43, and lot 45. Therefore, these sample data are the set of manufacture data having deficiencies of the A film process device name value, and the rest of the sample data are the set of the manufacture data without deficiencies.

The other explanatory variables are separated into a set of manufacture data having deficiencies and a set of manufacture data without deficiencies in the same manner.

Next, the number of occurrence of the same value, the number of deficiencies in a character item, and the number of deficiencies in a numerical value item are calculated for each sample data.

In the sample data Lot 02, for example, the device No. 1 is used twice in the whole process, and therefore, the number of usage of the device No. 1 is "2". the device name of the B exposure process is missing, and the B exposure process condition has deficiencies. Hence, the number of deficiencies in the character item and in numerical value items are respectively "1", and these values are added as new explanatory variable values.

As a result, "the number of usage of the device No. 1", "the number of deficiencies in character items" and "the number of deficiencies in numerical value items" are added as explanatory variables of the sample data, as shown in FIG. 9.

As described above, when "the number of usage of the device No. 1", "the number of deficiencies in character items" and "the number of deficiencies in the numerical value items" are added as the explanatory variables of the manufacture data, based on these data, the influence data, the rank of the influence, the deficiency influence rate, and analysis reliability rate of each explanatory variable are calculated.

FIG. 10 shows an evaluation value list of analysis result of the manufacture data in FIG. 9. This evaluation value list indicates ranking by the influence data, of intensity of the influence that each explanatory variable has on the objective variable.

It is proved from FIG. 10 that "the number of usage of the device No. 1" has the greatest impact on the percent defective, which is the objective variable, "the B exposure process conditions" has the second greatest impact on the percent defective, and "the number of deficiencies in character items" has the third greatest impact on the percent defective.

The values of the explanatory variable "the number of usage of the device No. 1" have four values of 0, 1, 2, or 3 in the whole sample data. These values are separated into two sets and the set is selected so that the value of the influence data of the separated sets becomes the maximum. In this example, the value of the influence data became maximum when the values are separated into a set with the number of usage of the device No. 1 being 2 or less and a set with the number of usage being 3 or more.

The sample data is separated into two sets by the number of usage being 2 or less or being 3 or more for "the number of usage of the device No. 1" of the explanatory variables. As shown in FIG. 10, in the set (the set with lower objective variance value) in which the target value "the number of usage of the device No. 1" is 2 or less, a mean value (mean) of the objective variable is "mean=5.79", the standard deviation s is "s=1.599", and the number of data N is "N=37". In the set (the set with higher objective variance value) with the target value being 3 or more, the mean value of the objective variance is "mean=9.10", the standard deviation is "s=2.229" and the number of data is "N=4".

When the difference in the mean values of the objective variables of these two sets is standardized by the difference in the standard variance, and t-value of the t-test is calculated, the value of the influence data is "3.7939". The influence data of all the explanatory variables is calculated, and the ranking of the influence regarding the deficiency influence rate is performed. As a result, the rank of the influence of the explanatory variable "number of usage of the device No. 1" on the percent defective is the highest.

The calculation of the present embodiment is under an assumption that the missing value of the number of usage of the device No. 1 does not exist, and therefore, the deficiency influence rate is "0" and the analysis reliability rate is "99.951%".

FIG. 11 is a graph showing the relation between the number of usage of the device No. 1 and the percent defective of the product. The number of usage of the device No. 1 is on the horizontal axis of the graph, and the percent defective (%) is on the vertical axis.

From the graph of FIG. 11, the mean value of the percent defective of the data with the number of usage of the device No. 1 being 2 or less ranges around "5.79%", indicating the difference from the mean value of the percent defective of the data with the number of usage being 3 or more.

The above result proves that the number of usage of the device No. 1 has the greatest influence on the percent defective. When the number of usage is 3 or more, the percent defective is high, while the percent defective is not very high with the number of usage being 2 or less.

Next, for the explanatory variable "B exposure process condition", the data is separated into two sets according to a criterion of whether the target value (exposure process condition value) is 5.6 or less or larger than 5.6. As shown in FIG. 10, in a set of data with the exposure process condition being 5.6 or less, the mean value of the percent defective is "5.53", the standard deviation is "1.801", and the number of data is "29". In the set of data with the exposure process condition being larger than 5.6, the mean value of the percent defective is "7.925", the standard deviation is "1.286" and the number of data is "8".

When calculating influence data from the mean values of the percent defective of the above two sets and the standard deviation, the influence value data is "3.5047". Therefore, the influence of the explanatory variable "B exposure process condition" on the objective variable is the second greatest in the rank.

In the set of data with the missing value of "B exposure process condition", the mean value of the percent defective is "6.75", the standard deviation is "1.4434", and the number of data is "4". The probability that there is a significant difference between the mean value of the percent defective of the set with missing values and the mean value of the percent defective of the set with the higher value of the two separated sets, and the probability that there is a significant difference between the mean value of the percent defective of the set with missing values and the mean value of the percent defective of the set with the lower value of the two separated sets are calculated. The mean value of these possibilities is calculated as the deficiency influence rate. The probability that the mean values have a significant difference is calculated by employing the t-distribution.

The deficiency influence rate in this case is "19.364%". The analysis reliability rate is calculated from the probability that there is a significant difference between the missing influence rate and the mean value of the percent defective of the two separated sets, and the analysis reliability rate is "80.535%".

Figure 12:
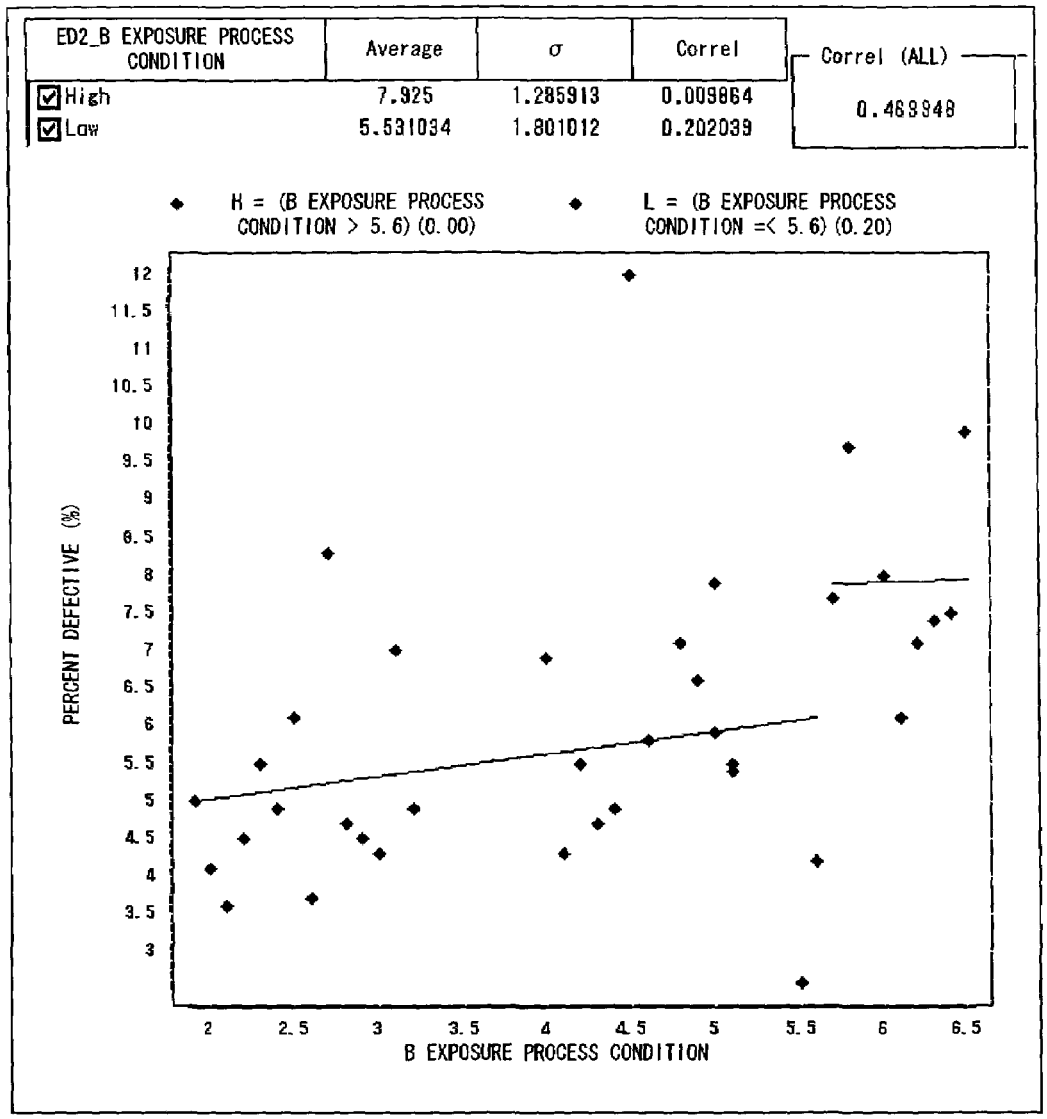
FIG. 12 is a diagram showing a correlation between the B exposure process condition and the percent defective.

FIG. 12 is a graph showing the relation between the B exposure process condition and the percent defective. The exposure process condition value is on the horizontal axis of the graph, and the percent defective in percentage is on the vertical axis of the graph.

The graph of FIG. 12 shows that the data with the exposure process condition value being 5.6 or less has the percent defective ranging around "5.53%" of the mean value. The data with the exposure process condition being larger than 5.6 has the percent defective larger than the range.

The evaluation value list of FIG. 10 and FIG. 12 proves that the percent defective becomes higher when the value of the explanatory variable "B exposure process condition" is greater than 5.6. The missing influence rate of FIG. 10 is 19.3%, and thus it is proved that the influence of the missing value of the explanatory variable "B exposure process condition" on this analysis result is small.

Next, for the explanatory variable "the number of deficiencies in character items", the data is separated into two sets according to a criterion of whether the target value (the number of deficiencies in character items) is 1 or more or 0 or less. As shown in FIG. 10, in a set of data with the number of deficiencies in character items being 1 or more, the mean value of the percent defective is "5.709", the standard deviation is "1.672", and the number of data is "32". In the set of data with the number of deficiencies in character items being 0 or less, the mean value of the percent defective is "7.75", the standard deviation is "2.105" and the number of data is "9".

When calculating the mean the influence data from the mean value of the percent defective of the above two sets and standard deviation, the value is "2.7819". Therefore, the influence of the explanatory variable "the number of deficiencies in character items" on the objective variable is the third greatest in the rank.

Figure 13:
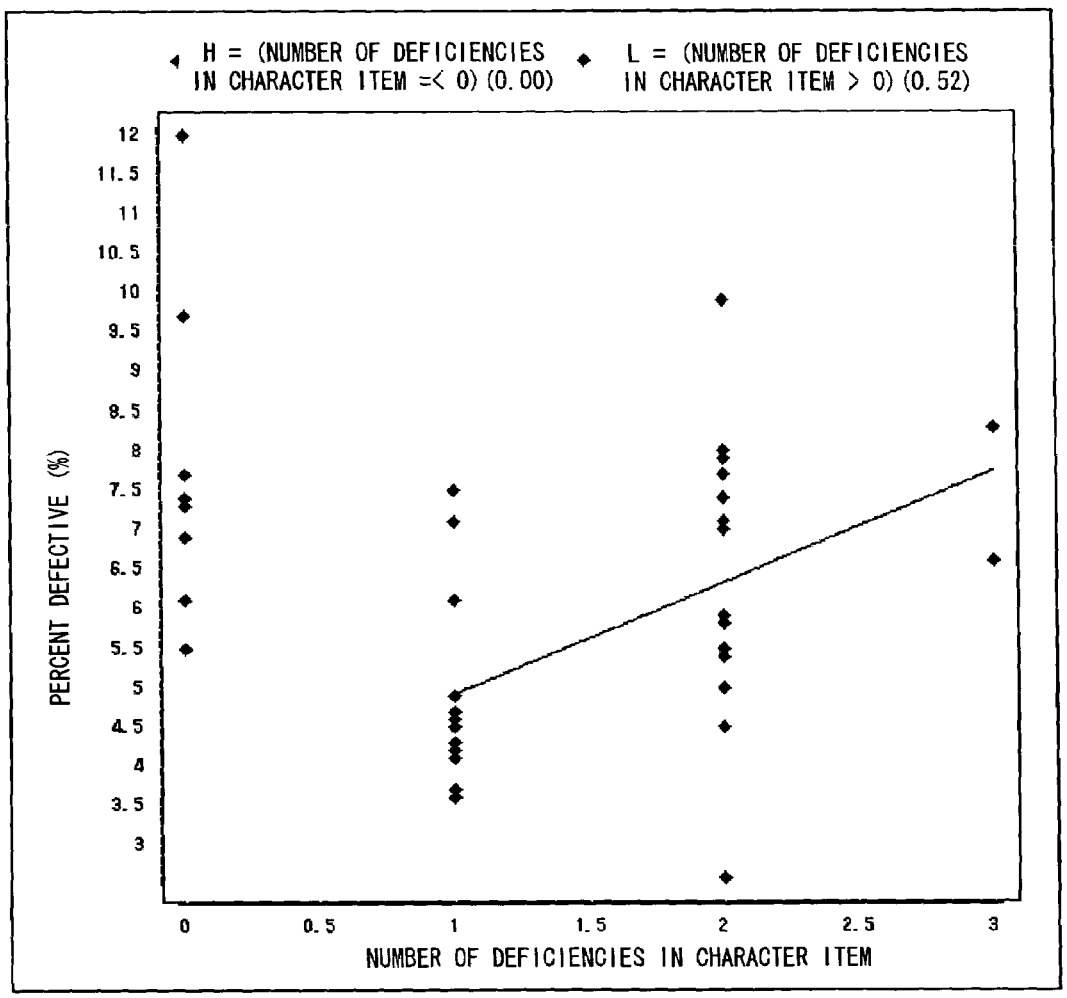
FIG. 13 is a diagram showing a correlation between the number of deficiencies in character items and the percent defective.

FIG. 13 is a graph showing the relation between the number of deficiencies in character items and the percent defective.

The value of the number of deficiencies in character items is on the horizontal axis of the graph and the percent defective in percentage is on the vertical axis of the graph.

From the graph of FIG. 13, the data with the number of deficiencies in character items being 1 or larger has the percent defective ranging around "5.709" of the mean value, while the data with the number of deficiencies being 0 or less has the percent defective with larger than the range.

The evaluation value list of FIG. 10 and FIG. 13 proves that the data with the value of the explanatory variable "the number of deficiencies in character items" being 0 has higher percent defective than the data with the number of deficiencies being 1 or larger.

Next, for the explanatory variable "B exposure process device name", the data is separated into two sets according to a criterion of whether the target value (exposure process device name) is missing or the device No. 1. As shown in FIG. 10, the median (med) of the percent defective of the set of the data using the device No. 1 is "6.50", the standard deviation is "1.910", and the number of data is "30".

When the influence data is calculated from the above value and the mean value of the percent defective of the data using the device No. 1, the influence data is "2.2837". Therefore, the influence of the explanatory variable "B exposure process device" on the percent defective is the forth highest in the rank.

The percent defective of the set of the manufacture data where the data of the "B exposure process device name" is missing has the median "4.70", the standard deviation "1.528" and the number of data "11".

The deficiency influence rate calculated from the above value and the mean value of the percent defective of the set having the missing value is "97.222". In addition, the analysis reliability rate calculated from the deficiency influence rate and the probability that there is a significant difference between mean values of the percent defective of the two sets (t-test value) is "2.778".

Figure 14:
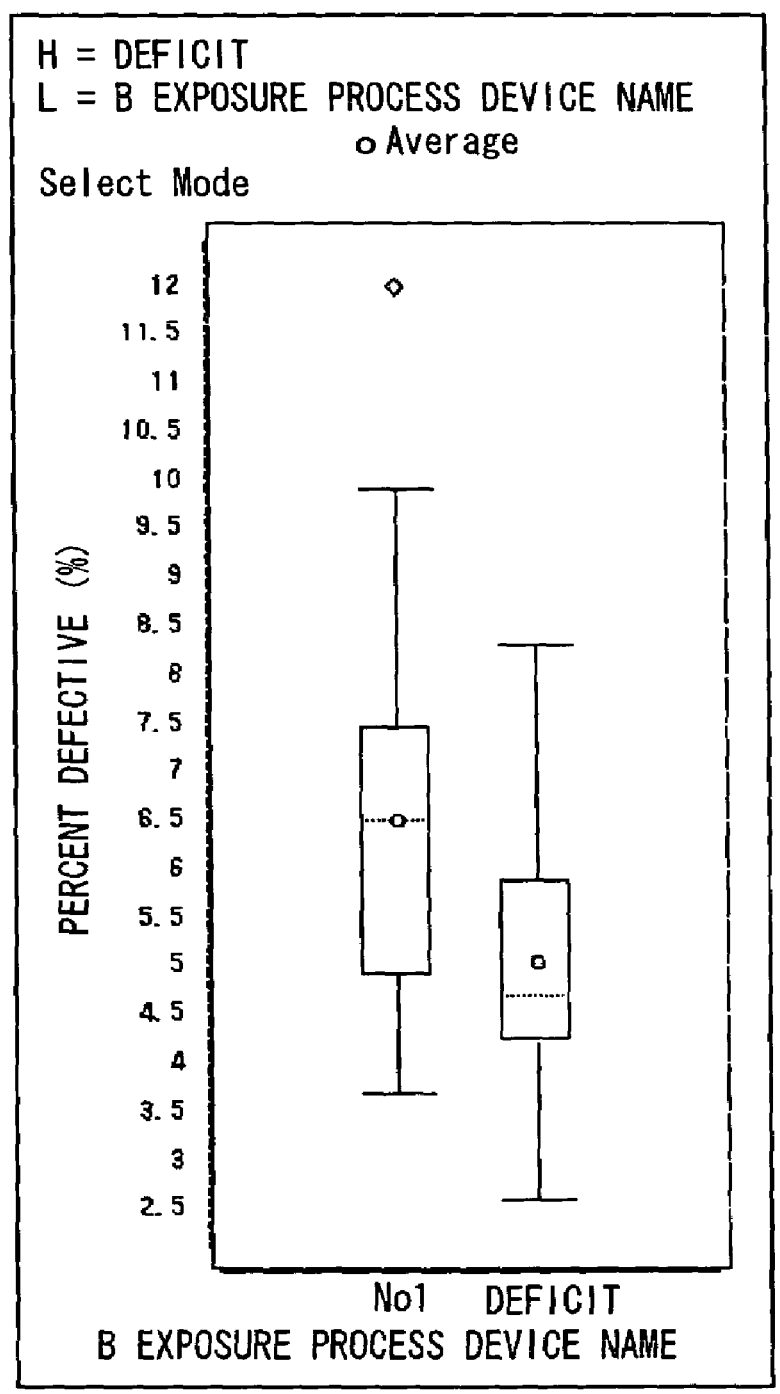
FIG. 14 is a diagram showing a correlation between the B exposure process device name and the percent defective.

FIG. 14 is a graph showing the relation between the B exposure process device name and the percent defective. The device name is on the horizontal axis of the graph and the percent defective in percentage is on the vertical axis of the graph.

The graph in FIG. 14 clearly shows that the percent defective of data where the device name is missing is lower than that of the data using the device No. 1 in the B exposure process.

The evaluation value list of FIG. 10 and FIG. 14 proves that there is a difference in the percent defective between the case that the B exposure process device name is missing and the case that the device No. 1 is used. However, it is difficult to accurately evaluate the influence of the device of the B exposure process on the percent defective without the reexamination of the actual missing value because the deficiency influence rate is high.

Next, for the explanatory variable "the C film process device name", the data is separated into two sets according to a criterion of whether the device name of the C film process is missing or is the device No. 1. As shown in FIG. 10, the median (med) of the percent defective of the set of the data using the device No. 1 is "6.10", the standard deviation is "2.349", and the number of data is "13".

When the influence data of "the C film process device name" is calculated from the above value and the mean value of the percent defective of the data using the device No. 1, the influence data is "0.9961". Therefore, the influence of the explanatory variable "C film process device name" on the percent defective is the fifth highest in the rank.

The percent defective of the set of the manufacture data where the data of the "C film process device name" is missing has the median "5.65", the standard deviation "1.683" and the number of data "28".

The deficiency influence rate calculated from the above value and the mean value of the percent defective of the set having the missing value is "67.481". The analysis reliability rate calculated from the deficiency influence rate is "32.519".

Figure 15:
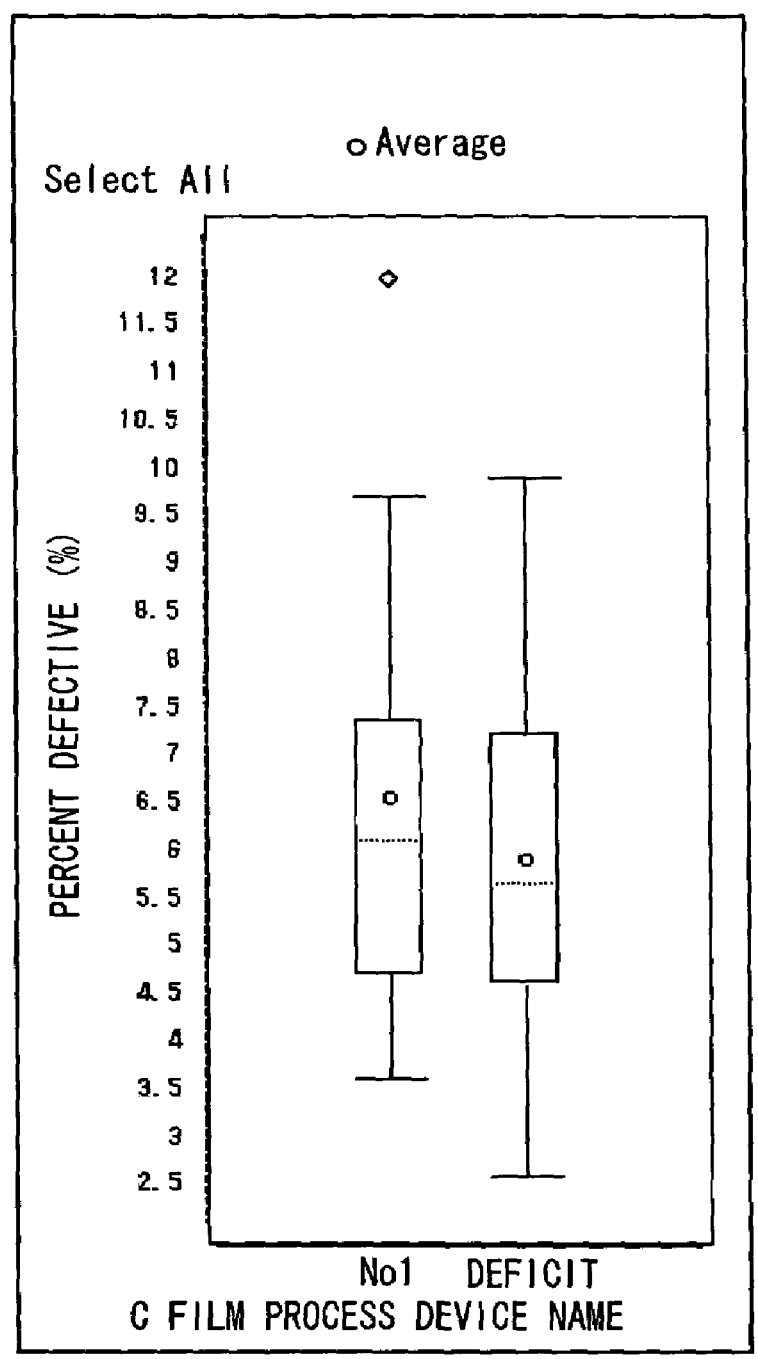
FIG. 15 is a diagram showing a correlation between the C film process device name and the percent defective.

FIG. 15 is a graph showing the relation between the C film process device name and the percent defective. The C film process device name is on the horizontal axis of the graph and the percent defective in percentage is on the vertical axis of the graph.

The graph in FIG. 15 shows that the percent defective of data where the device name is missing is slightly lower than that of the data using the device No. 1.

The evaluation value list of FIG. 10 and FIG. 15 proves that the influence of the C film process device name on the percent defective cannot be accurately evaluated without reexamination of the actual missing value for the explanatory variable "C film process device name" having a high deficiency influence value.

Next, for the explanatory variable "the number of deficiencies in numerical value items", the data is separated into two sets according to a criterion of whether the target value (the number of deficiencies in numerical value items) is 0 or smaller or is 1 or larger. As shown in FIG. 10, the mean value of the percent defective of the set of the data with the number of deficiencies in numerical value items being 0 is "6.05", the standard deviation is "1.960", and the number of data is "37". The mean value of the percent defective of the set of the data with the number of deficiencies being 1 or larger is "6.75", the standard deviation is "1.433", and the number of data is "4".

When the influence data of "the number of deficiencies in numerical value items" is calculated from the above value of the two separated sets, the influence data is "0.6921". Therefore, the influence of the explanatory variable "the number of deficiencies in numerical value items" on the percent defective is the sixth highest in the rank. In this case, the deficiency influence rate is 0%, and the analysis reliability rate is "50.713%".

Figure 16:
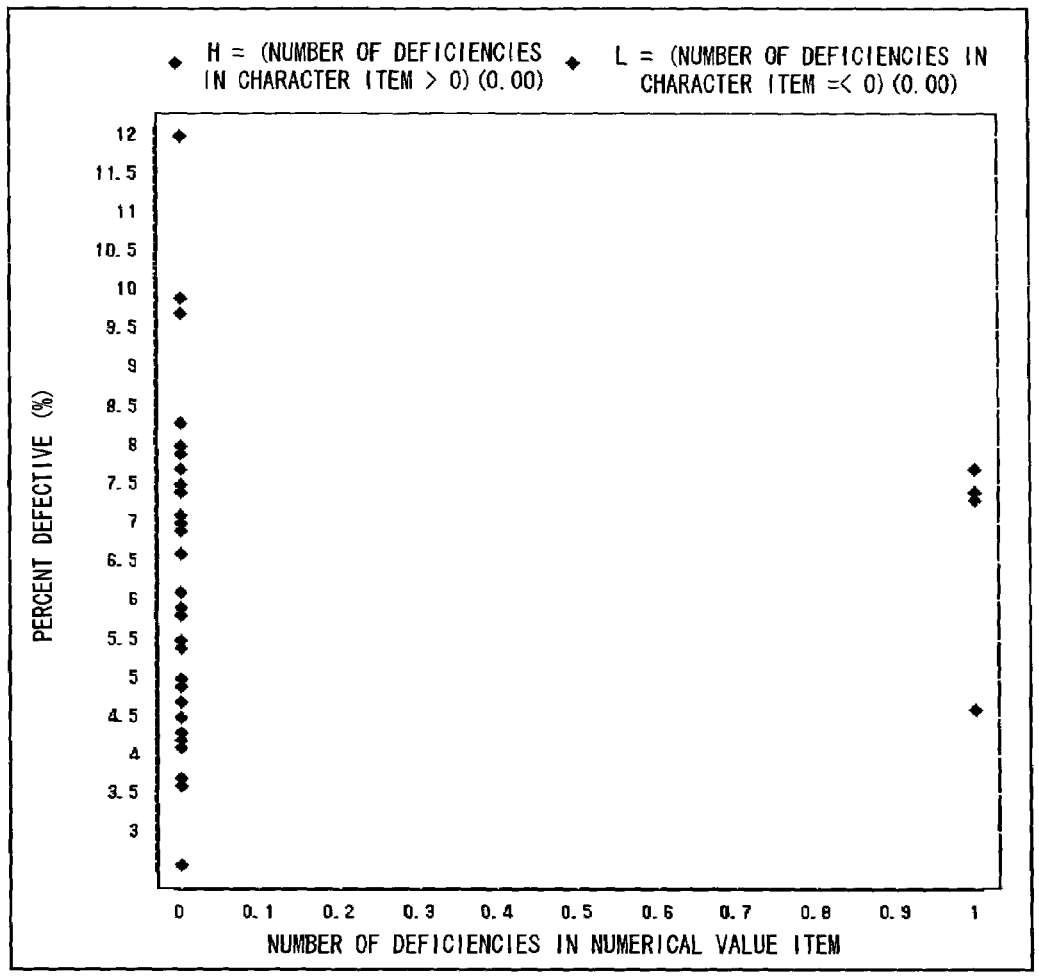
FIG. 16 is a diagram showing a correlation between the number of deficiencies in numerical value items.

FIG. 16 is a graph showing the relation between the number of deficiencies in numerical value items and the percent defective. The number of deficiencies in numerical value items is on the horizontal axis of the graph and the percent defective in percentage is on the vertical axis of the graph.

From the graph in FIG. 16, the percent defective of the data without deficiencies in the numerical value items shows wide variation, and there is not a large difference between the above percent defective and that of the data with the number of deficiencies in the numerical value items being 1.

The evaluation value list of FIG. 10 and FIG. 16 proves that the influence of the number of the deficiencies in numerical value item on the percent defective is small.

Next, for the explanatory variable "the A film process device name", the data is separated into two sets according to a criterion of whether the target value (the device name) is the device No. 5 or the device No. 1 or No. 3. The median (med) of the percent defective of the set of the data using the device No. 5 is "4.95", the standard deviation is "1.142", and the number of data is "10". The median of the percent defective of the set of the data using the device No. 1 or No. 3 is "7.40", the standard deviation is "1.2237", and the number of data is "20".

When the influence data of "A film process device name" is calculated from the above value of the two separated sets, the value is "0.4098".

The median of the percent defective of the set of data where "the C film process device name" is missing is "7.40", the standard deviation is "1.233" and the number of data is "11".

The deficiency influence rate calculated from the above value and the mean value of the percent defective of the set having the missing value is "98.1397". The analysis reliability rate is "0.5861".

FIG. 17 is a graph showing the relation between the A film process device name and the percent defective. The device name is on the horizontal axis of the graph and the percent defective in percentage is on the vertical axis of the graph.

The graph in FIG. 17 clearly shows that the percent defective of the data where the device name is missing is higher than that of the data where the device name is fixed, and thus, there is great influence of the missing value.

From the evaluation list in FIG. 10, and FIG. 17, it is difficult to evaluate the influence on the percent defective without reexamination of the actual missing value for the explanatory variable "A film process device name" having the high deficiency influence rate.

According to the first embodiment explained above, for each explanatory variable, the manufacture data is separated into a set of sample data (manufacture data) where values are missing and a set of manufacture data without the missing value. By analyzing these sets, the influence of the missing value of the explanatory variable on the analysis result can be quantitatively evaluated. Consequently, when the influence of the missing value on the objective variable is small, analysis of manufacture can be performed without using a substitution value, and therefore the data analysis accuracy can be improved compared with the analysis using a substitution value.

A plurality of manufacture data are separated into two sets in accordance with the explanatory variable value, the influence data indicating the influence intensity of the explanatory variable on the objective variable is calculated, and the probability that there is a difference between the percent defective including the manufacture data with the missing value and the percent defective excluding the manufacture data with the missing value is calculated as the deficiency influence rate. By so doing, when data is analyzed using the manufacture data with the missing value, the degree of influence of the missing value on the analysis result can be evaluated, which allows to improve the reliability of the analysis result. Additionally, by calculating the analysis reliability rate, the reliability of the analysis result using the manufacture data including missing values can be evaluated.

For a plurality of explanatory variables, the number of occurrence of the same value, or the number of deficiencies in character items or in numerical value items are counted, and the counted values is added to the sample data as new explanatory variables. It is possible from the analysis result of these explanatory variables to analyze whether a particular explanatory variable value or missing explanatory variable value influences on the objective variable (the percent defective, for example) or not.

In the semiconductor manufacture processes, for example, the same device may be used in a plurality of processes. For that reason, it is possible to determine whether the number of usage of the device has any influence on the percent defective or not by analysis of the relation between the number of usage of a particular device and the percent defective. By so doing, the analysis result, which cannot be obtained by simply analyzing the manufacture data from each manufacture process, that is the influence of the same value of the explanatory variable in a plurality of processes (device names and process conditions) on the percent defective, can be obtained. In the conventional analysis method, whether or not the number of missing values of the devices and process conditions influences on the objective variable such as the percent defectives, yields, and electrical characteristics is not considered at all. However, in the analysis method of the embodiment of the present invention, the influence of the factors such as a particular device or a particular process condition on the percent defective can be analyzed.

Next, the data analysis process of the second embodiment of the present invention is explained with reference to a flowchart in FIG. 18.

Figure 18:
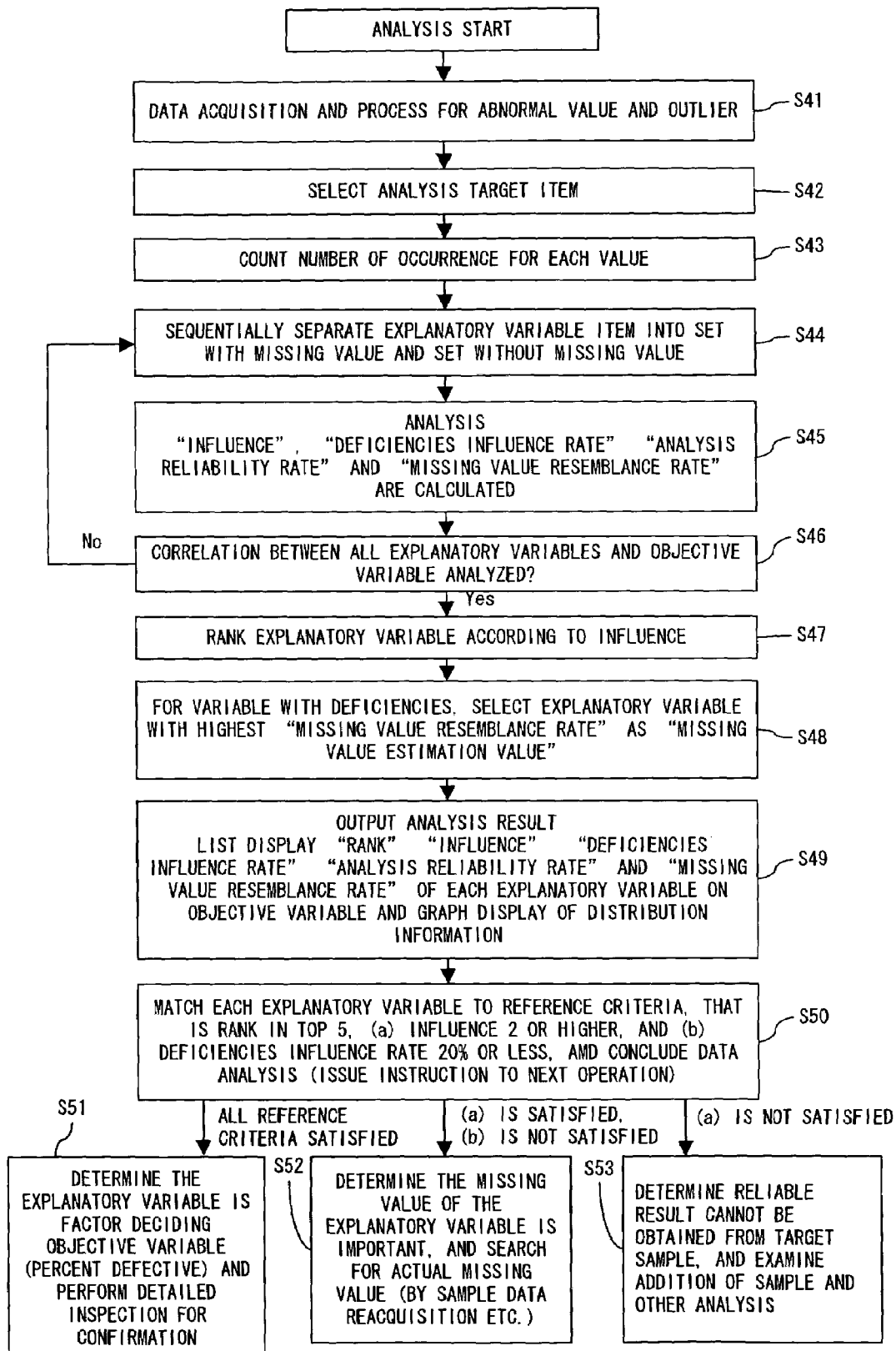
FIG. 18 is a flowchart of the data analysis process of the second embodiment.

The manufacture data of each manufacture process is first obtained, and abnormal values and anomalies are excluded (FIG. 18, S41). Determination of whether the manufacture data is an abnormal value or an anomaly or not is made by determining a device name, which does not exist in the manufacture process of the analysis target, as an abnormal value, and by determining the value of the explanatory variable, which does not fall into a range of a sample data average value ±4×standard deviation, as an anomaly, for example.

Next, the analysis target item is selected (S42). Then, an analysis target explanatory variable item is selected. For the analysis target item, for example, the device name of the A film process, the B exposure process conditions, the C film process device name, or the percent defective measured in the percent defective measurement process, as shown in FIG. 8, are selected.

Next, the number of occurrence for each value of the selected explanatory variable in each sample is counted (S43). This number of occurrence for each value includes the number of deficiencies in character items such as device names and the number of deficiencies in numerical value items.

Next, for each explanatory variable of each sample, the data is separated into a set where the value is missing and a set where the value is present (S44).

Next, the influence data (first evaluation value) indicating the influence intensity of each explanatory variable on the objective variable, the deficiency influence rate (second evaluation value) for evaluating the degree of influence of the manufacture data including the missing values on the relation between the explanatory variable and the objective variable, and the analysis reliability rate (third evaluation value) indicating the reliability of the analysis are calculated (S45).

Next, whether or not the relation between all explanatory variables and the objective variable is determined (S46). When unanalyzed explanatory variables remain (S46, NO), the process returns to the step S44, and the relation between the next explanatory variable and the objective variable is performed.

In step S46, when the analysis of the relation between all the explanatory variables and the objective variable is finished (S46, YES), the process proceeds to step S47, and ranking of each explanatory variable is performed in accordance with the amount of the influence data.

As a next step, the missing value resemblance rate is calculated from the set of data where the explanatory variable value is missing and the set of data of a particular value of the explanatory variables, and the explanatory variable value, which has the highest deficiency influence rate, is selected as a missing value estimated value (S48).

The missing value resemblance rate, for example, can be calculated by obtaining the probability that the mean value of the objective variable of the data set where the explanatory variable value is missing corresponds to the mean value of the data set of a particular value of the same explanatory variable by t-test. Alternatively, the missing value resemblance rate can be calculated by multiplying the probability obtained by t-test, the probability that two sets using the tests by kurtosis correspond to each other, and the probability that two sets using the tests by skewness correspond to each other.

Next, the rank, the influence data value, the deficiency influence rate, the analysis reliability rate, and the missing value resemblance rate of each explanatory variable are displayed on a list, and at the same time, the distribution information of each explanatory variable value and objective variable value is displayed on a graph (S49).

Next, by matching the rank of the explanatory variable, the influence data, the deficiency influence rate, and the missing value resemblance rate with a predetermined reference, calculated by the above method, this step determines whether the requirements that the rank of the influence data amount is within the top 5, the influence data value is 2 or higher (a condition (a)), and the deficiency influence is 20% or less (a condition (b)) are satisfied or not (S50).

When it is determined in the step S50 that the all requirements are satisfied, that is when the rank is within the top 5, the influence data being "2" or higher, and the deficiency influence rate is 20% or less, the process proceeds to the step S51, the explanatory variable is determined to be a significant factor deciding the objective variable (percent defective), and further detailed inspections for confirmation is performed.

When it is determined in the step S50 that the condition (a) is satisfied but the condition (b) is not satisfied, that is when the influence data value is "2" or higher but the deficiency influence rate is higher than 20%, the process proceeds to the step S52, the missing value is determined to influence the analysis result, and the actual missing value is searched with reference to the missing value resemblance rate and the missing value estimated value (by reacquisition of the sample data etc.)

When it is determined in the step S50 that the condition (a) is not satisfied, that is when the influence data value is less than 2, the process proceeds to the step S53, that a reliable analysis result cannot be obtained from the analysis target sample data is determined, and addition of the sample data and the other analysis methods are examined.

FIG. 19 is a diagram showing an evaluation list of the first branching candidate generated by the above manufacture data analysis process.

According to the evaluation list of FIG. 19, an "item D" of the explanatory variable has the influence data value of "13.9181", and the deficiency influence rate of "15.426", which satisfy all the requirements of step S50 of FIG. 18. Therefore, the "item D" is determined to be a factor having the greatest influence on the objective variable (percent defective, for example).

When the missing value resemblance rate between the data set having the missing explanatory variable "item D" value and the set of a particular value of the explanatory variable "item D" is calculated according to the above calculation method, the missing value resemblance rate with "device No. 3" is the highest of "79.456%", and therefore, the missing value estimation value of the explanatory variable "item D" is "device No. 3".

It should be noted that in FIG. 19, "No 2, No 5=0.70, s=0.32" in the section "lower set and distribution" and "No 3=0.86, s=0.21" in the section "higher set and distribution" in the row "item D" indicate the mean value of the objective variable and the standard deviation of each set when the sample data is separated into two so as to have a set where the value of "item D" is "device No. 3 or No. 5" and a set where the value of "item D" is "device No. 3".

"mean=0.858, s=0.25" in the section "missing value set distribution" indicates the mean value of the objective variable and the standard deviation s of the data set having the missing explanatory variable "item D" value.

For the explanatory variable "item A", which is second in the influence rank, the missing value resemblance rate of the set where the "item A" value is "11.6" is the highest of "55.41%", and therefore the missing value estimation value is "11.6".

In the same manner, for the explanatory variable "item C", which is third in the influence rank, the missing value resemblance rate of the missing value set and the set of "device No. 4" is "44.12%", which is the highest, and therefore, the missing value estimation value of the explanatory variable "item C" is "device No. 4".

Figure 20:
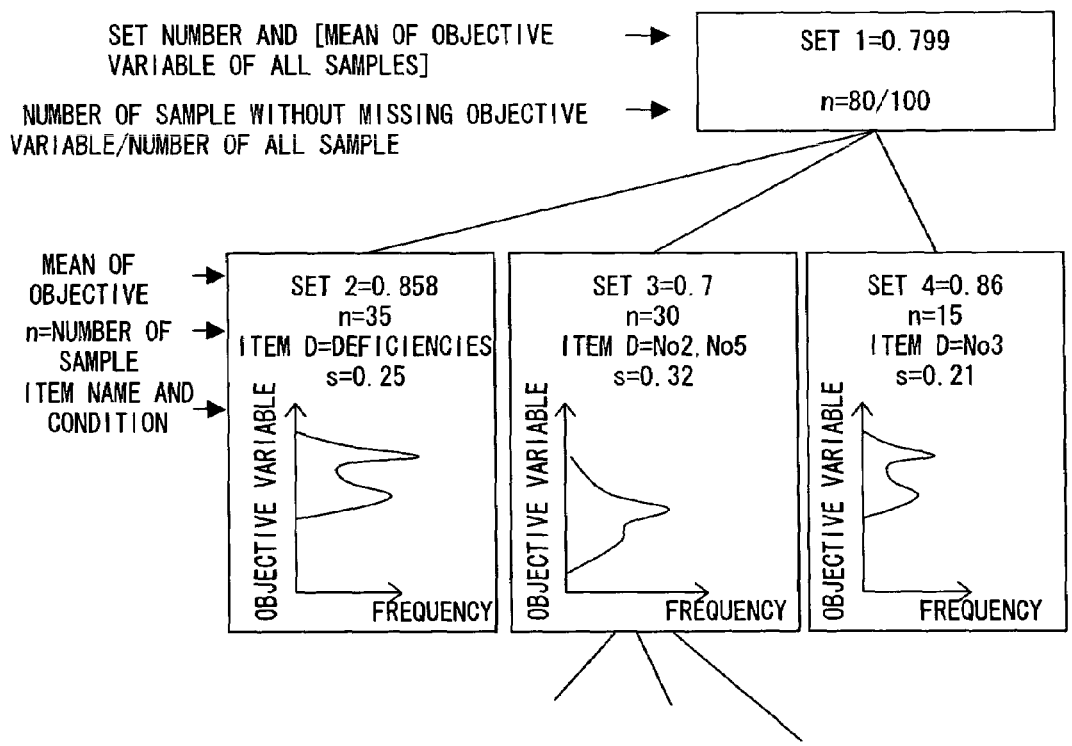
FIG. 20 is a diagram showing distribution of the objective variable of each set.

Next, FIG. 20 is a diagram showing the distribution of the objective variable of each set when a tree diagram of the explanatory variable "item D" is generated.

As shown in FIG. 20, the number of all samples is "100" and the number of samples without the missing objective variable is "80" (this set is hereinafter referred to as set 1).

The data set with missing "item D" value (this set is hereinafter referred to as set 2) has objective variables with the mean value being "0.858", the number of data being "35" and the standard deviation s being "0.25".

The set with "item D" value of "device No. 2 or No. 5" (this set is hereinafter referred to as set 3) has objective variables with the mean value being "0.7", the number of data being "30", and the standard deviation being "0.32".

The set with "item D" value of "device No. 3" (this set is hereinafter referred to as set 4) has objective variables with the mean value being "0.86", the number of data being "15", and the standard deviation being "0.21". The set 3 is separated into a plurality of sets as the downside branch lines indicate.

When the missing value resemblance rate of the above set 2 and set 3, and that of the above set 2 and set 4 are calculated, the missing value resemblance rate with set 4 is the highest as shown in FIG. 19.

Furthermore, the distribution profiles of the objective variable values of the set 2, the set 3 and the set 4 are compared with each other, and it is found that the distribution profile of the set 2 resembles that of the set 4.

From the above analysis result, it is estimated that the value "device No. 3" of the set 4 has the highest probability as the missing value of the explanatory variable "item D".

According to the above second embodiment, the probability that the set of the missing values of the explanatory variable values corresponds to the set of the other values of the same explanatory variable is calculated as the missing value resemblance rate, and the explanatory variable value, which has the highest missing value resemblance rate, is estimated to be the missing value. Additionally, the influence of the missing value of the explanatory variable on the objective variable (percent defective, for example) can be obtained as the deficiency influence rate.

Like the first embodiment, the second embodiment enables to separate the data into a set with the missing explanatory variable value and a set without the missing explanatory variable value and to evaluate the degree of the influence of the set with missing value on the objective values by the deficiency influence rate etc., and consequently, the manufacture data analysis accuracy and analysis reliability can be improved.

According to the present invention, even when there is a deficiency in a part of manufacture data, by analyzing the set with the missing value, manufacture data analysis accuracy can be improved. Also, by evaluating the influence of the missing value of the explanatory variable on the analysis result, the analysis reliability can be improved.

The present invention is not limited to the above-described embodiments; however, the following configurations are also possible.

(1) Although the present embodiments employs t-test for calculation of the influence data, the deficiency influence rate and others, the evaluation value can be calculated by employing test methods other than t-test.

(2) Although the explained present embodiment involves manufacture data analysis of semiconductor manufacture processes; however, it is not limited to the semiconductor manufacture processes, but the present invention can be applied to analysis of data of other manufacture processes or data other than manufacture processes.

(3) Calculation methods of the deficiency influence rate, the analysis reliability rate and the missing value resemblance rate are not limited to the methods described in the present embodiments; however, other calculation methods suitable for the analysis methods can be employed.

What is claimed is:

1. A manufacture data analysis method running on a processor, comprising:
   acquiring and storing manufacture data comprising a plurality of values of explanatory variables of a plurality of manufacture processes and an objective variable indicating quality of a product manufactured by a plurality of the manufacture processes;
   separating a plurality of the stored manufacture data into a set of manufacture data in which an explanatory variable value is missing and a set of manufacture data in which an explanatory variable value is not missing;
   separating the set of manufacture data in which the explanatory variable value is not missing, into a first set and a second set, calculating value of influence data based on a difference between a mean value of an objective variable of the first set and a mean value of an objective variable of the second set, and separating the first set and the second set so that the value of the influence data becomes a maximum;
   calculating a deficiency influence rate indicating a probability of having different analysis results between when the analysis includes the sets of manufacture data in which the explanatory variable is missing and when the analysis does not include the manufacture data in which the explanatory variable is missing but includes the first and second sets of the manufacture data;
   evaluating whether or not a missing value of the explanatory variable influences an analysis result based on the value of the influence data and the deficiency influence rate; and
   generating the analysis result for later use.

2. The manufacture data analysis method according to claim 1, wherein;
   a value of the difference between the mean value of the objective variable of the first set and the mean value of the objective variable of the second set standardized by a difference in standard deviations of the first set and the second set is calculated as the influence data.

3. The manufacture data analysis method according to claim 1, further comprising:
   calculating a first probability indicating whether or not there is a significant difference between mean values of the objective variable of the manufacture data set in which the explanatory variable value is missing and of the first set and a second probability indicating whether or not there is a significant difference between mean values of the objective variable of the manufacture data set in which the explanatory variable value is missing and of the second set, and calculating a mean value of a sum of the first probability and the second probability as a deficiency influence rate; and
   evaluating the degree of influence, on an analysis result, of the manufacture data in which the explanatory variable value is missing, based on the influence data and the deficiency influence rate.

4. The manufacture data analysis method according to claim 3, further comprising:
   calculating an analysis reliability rate obtained by (1-deficiency influence rate)/(a probability indicating whether or not there is a significant difference between the mean values of the objective variable values of the first set and the second set).

5. The manufacture data analysis method according to claim 1, further comprising:
   counting the number of occurrences of the same value in a plurality of explanatory variables;
   adding the counted number of occurrences as a new explanatory variable; and
   calculating influence data indicating the intensity of the influence of the number of occurrences on the objective variable.

6. The manufacture data analysis method according to claim 1, comprising:
   counting the number of deficiencies of a character string or a numerical value, which is the explanatory variable value;

adding the counted number of occurrences as a new explanatory variable value; and calculating influence data indicating the intensity of the influence of the number of deficiencies on the objective variable.

7. The manufacture data analysis method according to claim 1, further comprising:

counting the number of occurrences of the explanatory variable values of each manufacture data;

adding the counted number of occurrences to the manufacture data as a new explanatory variable;

separating a plurality of manufacture data into at least two sets based on the number of occurrences; and calculating the influence data indicating the intensity of the influence of the number of occurrences on the objective variable, based on the objective variable values in the two sets.

8. The manufacture data analysis method according to claim 1, further comprising:

counting the number of deficiencies of the explanatory variable values of each manufacture data;

adding the counted number of deficiencies to the manufacture data as a new explanatory variable;

separating a plurality of manufacture data into at least two sets based on the number of deficiencies; and calculating the influence data indicating the intensity of the influence of the number of deficiencies on the objective variable, based on the objective variable values in the two sets.

9. The manufacture data analysis method according to claim 1, further comprising:

separating the set of manufacture data in which the explanatory variable value is not missing into a first set and a second set so that a difference in mean values of the objective variable in two sets becomes larger;

calculating influence data indicating the intensity of the influence of each explanatory variable on the objective variable based on a mean value of the objective variable values of the first set and a mean value of the objective variable values of the second set and standard deviations of each mean value;

calculating a deficiency influence rate based on a first probability indicating whether or not there is a significant difference between a mean value of the objective variable values of the manufacture data set in which an explanatory variable value is missing and a mean value of the objective variable values of the first set and a second probability indicating whether or not there is a significant difference between a mean value of the objective variable values of the manufacture data set in which the explanatory variable value is missing and a mean values of the objective variable value of the second set;

ranking the explanatory variables in the order of the intensity of the influence on the objective variable based on the influence data; and evaluating, based on the rank indicating the intensity of the influence, the influence data and the deficiency influence rate, whether or not the explanatory variable influences on the objective variable.

10. The manufacture data analysis method according to claim 9, further comprising:

calculating an analysis reliability rate as a third evaluation value obtained by (1-deficiency influence rate)/(a probability indicating whether or not there is a significant difference between the mean values of the objective variable values of the first set and the second set); and evaluating the reliability of an analysis result by determining whether or not the third evaluation value is at a prescribed value or above.

11. The manufacture data analysis method according to claim 1, further comprising:

calculating a missing value resemblance rate based on the objective variable values of the manufacture data set in which an explanatory variable value is missing and a set of one or a plurality of the explanatory variable value(s); and estimating the explanatory variable value of the set with the highest missing value resemblance rate as the missing value.

12. A manufacture data analysis apparatus comprising:

a data acquisition unit configured to acquire manufacture data comprising a plurality of values of explanatory variable of a plurality of manufacture processes and an objective variable indicating quality of a product manufactured by a plurality of the manufacture processes;

a separation unit configured to separate a plurality of the manufacture data acquired by the data acquisition unit into a set of manufacture data in which an explanatory variable value is missing and a set of manufacture data in which an explanatory variable value is not missing, to separate the set of manufacture data in which the explanatory variable value is not missing first set and a second set, calculating a value of influence data based on a difference between a mean value of an objective variable of the first set and a mean value of an objective variable of the second set, and to separate the first set and the second set so that the value of the influence data becomes a maximum;

calculating unit configured to calculate a deficiency influence rate indicating a probability of having different analysis results between when the analysis includes the sets of manufacture data in which the explanatory variable is missing and when the analysis does not include the manufacture data in which the explanatory variable is missing but includes the first and second sets of the manufacture data; and an analysis unit configured to calculate whether or not a missing value of the explanatory variable influences an analysis result based on the value of the influence data and the deficiency influence rate.

13. The manufacture data analysis apparatus according to claim 12, wherein the analysis unit calculates a value of the difference between the mean value of the objective variable of the first set and the mean value of the objective variable of the second set standardized by a difference in standard deviations of the first set and the second set as the influence data.

14. The manufacture data analysis apparatus according to claim 12, wherein the analysis unit counts the number of occurrences of the same value in a plurality of explanatory variables, adds the counted number of occurrences as a new explanatory variable, and calculates influence data indicating the intensity of the influence of the number of occurrences on the objective variable.

15. The manufacture data analysis apparatus according to claim 12, wherein the analysis unit calculates a first probability indicating whether or not there is a significant difference between mean values of the objective variable of the manufacture data set in which the explanatory variable value is missing and of the first set and a second probability indicating whether or not there is a significant difference between mean values of the objective variable of the manufacture data set in which the explanatory variable value is missing and of the second set, and calculates a mean value of a sum of the first probability and the second probability as a deficiency influence rate; and evaluates the degree of influence, on an analysis result, of the manufacture data in which the explanatory variable value is missing, based on the influence data and the deficiency influence rate.

16. The manufacture data analysis apparatus according to claim 15, wherein the analysis unit calculates an analysis reliability rate as a third evaluation value obtained by (1-deficiency influence rate)/(a probability indicating whether or not there is a significant difference between the mean values of the objective variable values of the first set and the second set).

17. The manufacture data analysis apparatus according to claim 12, wherein the analysis unit
calculates a first probability indicating whether or not there is a significant difference between mean values of the objective variable of the manufacture data set with a missing explanatory variable value and of the first set and a second probability indicating whether or not there is a significant difference between mean values of the objective variable of the manufacture data set with a missing explanatory variable value and of the second set, and calculating a mean value of a sum of the first probability and the second probability as a deficiency influence rate;
ranks the explanatory variable values in the order of the intensity of the influence on the objective variable based on the first evaluation value; and
evaluates the intensity of the influence of the explanatory variable on the objective variable according to criteria of whether or not the rank indicating the intensity of the influence is in a prescribed rank or above and the deficiency influence rate of the explanatory variable having great influence on the objective variable is at a prescribed reference value or under.

18. The manufacture data analysis apparatus according to claim 12, wherein the analysis unit calculates a missing value resemblance rate based on the objective variable values of the manufacture data set in which an explanatory variable value is missing and a set of one or a plurality of the explanatory variable value(s), and estimates the explanatory variable value of the set with the highest missing value resemblance rate as the missing value.

19. A computer-readable recording medium for storing a manufacture data analysis program comprising:
a process of acquiring and storing manufacture data comprising a plurality of values of explanatory variables of a plurality of manufacture processes and an objective variable indicating quality of a product manufactured by a plurality of the manufacture processes; separating a plurality of the stored manufacture data into a set of manufacture data in which an explanatory variable value is missing and a set of manufacture data in which an explanatory variable value is not missing;
a process of separating the set of manufacture data in which the explanatory variable value is not missing, into a first set and a second set, calculating value of influence data based on a difference between a mean value of an objective variable of the first set and a mean value of an objective variable of the second set, and separating the first set and the second set so that the value of the influence data becomes a maximum;
a process of calculating a deficiency influence rate indicating a probability of having different analysis results between when the analysis includes the sets of manufacture data in which the explanatory variable is missing and when the analysis does not include the manufacture data in which the explanatory variable is missing but includes the first and second sets of the manufacture data;
a process of evaluating whether or not a missing value of the explanatory variable influences an analysis result based on the value of the influence data and the deficiency influence rate; and a process of generating the analysis result for later use.

20. The recording medium according to claim 19, wherein the evaluation process calculates a value of the difference between the mean value of the objective variable of the first set and the mean value of the objective variable of the second set standardized by a difference in standard deviations of the first set and the second set as the influence data.

21. The recording medium according to claim 19, wherein the evaluation process calculates a first probability indicating whether or not there is a significant difference between mean values of the objective variable of the manufacture data set in which the explanatory variable value is missing and of the first set and a second probability indicating whether or not there is a significant difference between mean values of the objective variable of the manufacture data set in which the explanatory variable value is missing and of the second set, and calculates a mean value of a sum of the first probability and the second probability is a deficiency influence rate; and evaluates the degree of influence, on an analysis result, of the manufacture data in which the explanatory variable value is missing, based on the influence data and the deficiency influence rate.

* * * * *